(12) United States Patent
Scheiner et al.

(10) Patent No.: US 6,815,947 B2
(45) Date of Patent: Nov. 9, 2004

(54) METHOD AND SYSTEM FOR THICKNESS MEASUREMENTS OF THIN CONDUCTIVE LAYERS

(75) Inventors: David Scheiner, Ganei Yehuda (IL); Yoav Many, Ramat Gan (IL); Rahamin Guliamov, Rehovot (IL); Shahar Gov, Rehovot (IL)

(73) Assignee: Nova Measuring Instruments Ltd., Rehovot (IL)

( * ) Notice: Subject to any disclaimer, the term of this patent is extended or adjusted under 35 U.S.C. 154(b) by 0 days.

(21) Appl. No.: 10/459,711

(22) Filed: Jun. 12, 2003

(65) Prior Publication Data

US 2004/0138838 A1 Jul. 15, 2004

(30) Foreign Application Priority Data

Jan. 12, 2003 (IL) ................................. 153894

(51) Int. Cl.[7] .............................................. G01B 7/10
(52) U.S. Cl. ...................... 324/230; 324/229
(58) Field of Search ............................. 324/230, 229, 324/226, 227, 231

(56) References Cited

U.S. PATENT DOCUMENTS

| | | | |
|---|---|---|---|
| 4,849,694 A | 7/1989 | Coates | 324/230 |
| 5,552,704 A | 9/1996 | Mallory et al. | 324/233 |
| 5,604,344 A | 2/1997 | Finarov | 250/201.3 |
| 6,407,546 B1 | 6/2002 | Le et al. | 324/230 |
| 6,433,541 B1 | 8/2002 | Lehman et al. | 324/230 |
| 6,593,738 B2 * | 7/2003 | Kesil et al. | 324/230 |
| 6,700,370 B2 * | 3/2004 | Chen et al. | 324/230 |
| 2001/0008827 A1 | 7/2001 | Kimura et al. | 451/8 |
| 2001/0054896 A1 | 12/2001 | Mednikov et al. | 324/225 |
| 2002/0047705 A1 | 4/2002 | Tada et al. | 324/230 |
| 2002/0053904 A1 | 5/2002 | Chen et al. | 324/230 |
| 2002/0077031 A1 | 6/2002 | Johansson et al. | 451/6 |

FOREIGN PATENT DOCUMENTS

WO  WO 01/46684  6/2001

OTHER PUBLICATIONS

Lim, Sheldon C. P., et al., "An Overview of Thickness Measurement Techniques for Metallic Thin Films". Solid State Technology, 26: 99–103, Feb. 1983.

* cited by examiner

Primary Examiner—Vincent Q. Nguyen
(74) Attorney, Agent, or Firm—Nath & Associates PLLC; Marvin C. Berkowitz

(57) ABSTRACT

A method and system are presented for measuring in an electrically conductive film of a specific sample including data indicative of a free space response of an RF sensing coil unit to AC voltage applied to the RF sensing coil. The sensing coil is located proximate to the sample at a distance h substantially not exceeding 0.2 r wherein r is the coil radius; an AC voltage in a range from 100 MHz to a few GHz is applied to the sensing coil to cause generation of an eddy current passage through the conductive film; a response of the sensing coil to an effect of the electric current through the conductive film onto a magnetic field of the coil is detected and the measured data indicative of the response is generated. The thickness of the film is determined by utilizing the data indicative of the free space measurements to analyze the measured date. The method thus provides for measuring in conductive films with a sheet resistance Rs in a range from about 0.009 to about 2 Ohm/m$^2$.

41 Claims, 16 Drawing Sheets

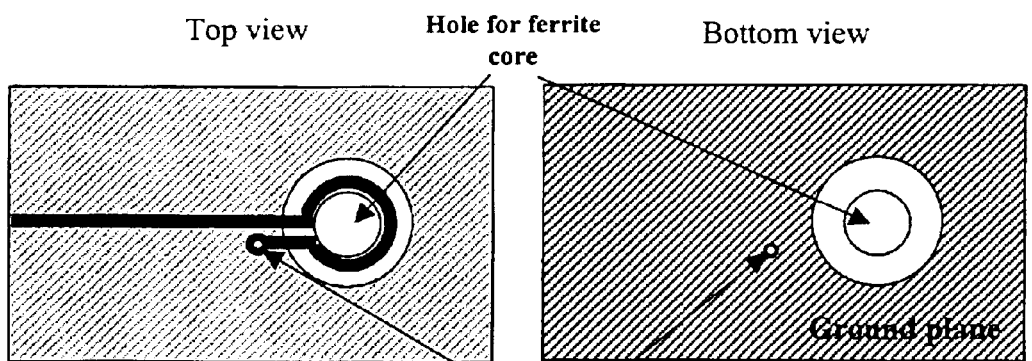
Fig. 3B
Fig. 3C
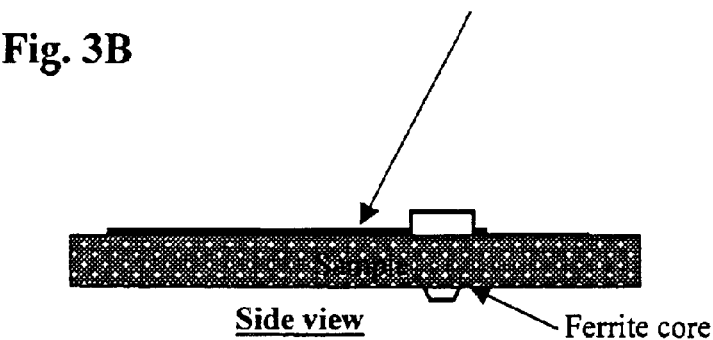
Fig. 3D

METHOD AND SYSTEM FOR THICKNESS MEASUREMENTS OF THIN CONDUCTIVE LAYERS

FIELD OF THE INVENTION

This invention is generally in the field of electrical measurements and relates to a method and system for measuring a thickness of a conductive film. The present invention is particularly useful for measuring conductive layer bearing structures for contactless electrical testing. The technique of the present invention can be used for controlling a certain process of the sample manufacture, for example manufacture of semiconductor wafers.

BACKGROUND OF THE INVENTION

The manufacture of semiconductor devices typically includes a process of depositing a metal layer onto a semiconductor wafer in order to define interconnects. The quality of this process, as well as that of a process of removing metal from selected regions (e.g., polishing) that follows the deposition process, should be controlled.

FIG. 1 illustrates a cross section of a copper-based wafer structure 10 (utilizing copper interconnects patterned with a known dual Damascene process) prior to the application of a CMP process to the structure. The structure 10 includes a substrate 11 with an inter layer dielectric (ILD) 12 thereon, optional "etch stop" layer 14 (e.g., SiN), ILD layer portions 16 and 18, and a copper layer 20. These stack layers define a dense structure 22, which is composed of the ILD layer portions 18 and copper layer 20, and is surrounded by the ILD field layer portions 16.

Copper is deposited by one of the known techniques, such as CVD, PVD electroplating or electroless plating. Depending on the deposition process, the uppermost copper layer 20 has certain topology, namely, has the topology within the dense structure 22 repeating that of the underlying pattern.

It should be noted that, if electroplating is used, a thin copper seed layer 24 (with the thickness of about 1000–5000 A) should be deposited onto the structure prior to the deposition of the layer 20 as a prerequisite for electroplating. The thickness of this layer could be measured by optical- or electrical-based techniques. Additionally, although not specifically shown, a barrier layer (TaN or Ta) is typically provided above the ILD layer portions 16 and 18 to prevent copper migration therein.

After deposition, a chemical-mechanical polishing (CMP) is applied in order to remove copper from the top ILD surface and thus to leave copper only within the ILD trenches.

Copper CMP is a complex process because of the need to completely remove the barrier layers and copper, without the overpolishing of any feature. This is difficult because current copper deposition processes are not as uniform as the oxide deposition process. To this end, the quality of the copper deposition process should be controlled.

Contact electrical-based measurement techniques have been developed and are disclosed, for example, in the scientific article "*An Overview of Thickness Measurement Techniques for Metallic Thin Films*", S. C. P. Lim and D. Ridley, Solid State Technology, February 1983, pp. 99–103.

It is also known to use an eddy current passage through a conductive film for contactless measurement of the film properties, such as conductance/resistance and thickness. Such a technique is disclosed, for example, in U.S. Pat. No. 4,849,694. This technique utilizes an eddy current apparatus including an alternating frequency driving coil, a detector coil mounted in a housing adjacent one surface of the thin film, and circuitry for measuring the signal across the detector coil which senses the field after it is subjected to the eddy currents generated within the conductive film. Precise adjustment of a fixed distance between coils and film surface is important and achievable by positioning the film surface at the focal point of an optical microscope objective lens to which the eddy current apparatus is coupled.

Another techniques of the kind specified are disclosed in the following patent publications:

WO 01/46684 discloses in-situ metallization monitoring using eddy current measurements and optical measurements that can be integrated in a CMP machine. According to this technique, an eddy-current sensor (ESC) and an optical reflectivity sensor are embedded in the polishing table. The eddy-current sensor (ECS) operates with relativity low frequency (up to 100 MHz). A measuring scheme utilizes two coils in balanced bridge, a differential amplifier, a synchronous detection (in-phase and in-quadrature). The optical sensor simply measures the reflection from the wafer under measurements: polishing end point corresponds with a dip in reflectivity graph (vs. time).

U.S. Pat. No. 6,433,541 discloses a method and apparatus of obtaining information in-situ regarding a film of a sample using an eddy probe during a process for removing the film. The eddy probe has at least one sensing coil. An AC voltage is applied to the sensing coil(s), and one or more first signals are measured when the sensing coil(s) are positioned proximate the film of the sample, and one or more second signals are measured when the sensing coil(s) are positioned proximate to a reference material having a fixed composition and/or distance from the sensing coil. The first signals are calibrated based on the second signals so that undesired gain and/or phase changes within the first signals are corrected. A property value of the film is determined based on the calibrated first signals.

U.S. Pat. No. 6,407,546 discloses a non-contact technique for using an eddy current probe for measuring the thickness of metal layers disposed on semi-conductor wafer products. This technique utilizes a probe housing, comprising an eddy current sense coil and a linear motion controller, and a computer that controls the linear motion controller and the eddy current sense coil. The computer identifies a thickness of the inspection sample by a method comprising the generation of a natural intercepting curve based on resistance and reactance measurements of at least two data points. Then, a plurality of corresponding resistance and reactance measurements of a location on the inspection sample is obtained with the eddy current sensor, where the eddy current sensor makes a first measurement at a first distance from the inspection sample, and makes each of the remaining plurality of measurements at a distance that is incrementally further away from the inspection surface. Next an inspection sample curve is generated based on the plurality of corresponding resistance and reactance measurements obtained from the inspection sample. An intersection point between the natural intercepting curve and the inspection sample curve is also generated. A vector impedance for each of the at least two data points, and the intersection point, is calculated to identify a closest two data points that the intersection point is positioned. Then, the thickness of the identified location of the inspection sample is calculated by performing an interpolation between the closest two data points.

U.S. Pat. No. 5,552,704 discloses an eddy current test method and apparatus for measuring conductance. According to this method, an eddy current probe is used, without the need for measurement or knowledge of the separation between probe and sample. The probe comprises sense and drive coils mounted in close proximity to each other (or a single coil which functions as both a sense and drive coil), circuitry for producing AC voltage in the drive coil, and a meter for measuring in-phase and quadrature components of induced voltage in the sense coil. Look-up table data can be generated for use in subsequent measurements on samples of unknown conductance by performing eddy current measurements on samples having different known conductances to generate reference lift-off curves, processing the reference lift-off curves to determine a conductance function relating each known conductance to a location along a selected curve, and storing conductance values determined by the conductance function for different points on the selected curve as the look-up table data. An unknown sample conductance can then be determined by generating a lift-off curve from voltage measurements at different probe separations from the sample, determining a new intersection voltage pair representing the intersection of the lift-off curve with the selected curve, and determining the unknown conductance as a look-up table value indexed by the new intersection voltage pair.

U.S. Patent Publication No. 2002/0053904 discloses an apparatus for measuring the thickness of a thin conductive film formed on a substrate. The apparatus of the invention includes an eddy current coil sensor, disposable at a predetermined position near a conductive film, for generating a predetermined eddy current in the conductive film and for detecting a magnetic field caused by the eddy current. The apparatus also includes a displacement sensor for measuring a displacement between the eddy current coil sensor and the conductive film. The thickness of the conductive film is measured in accordance with a variation in inductance of the eddy current coil sensor and the amount of displacement measured by the displacement sensor.

U.S. patent publication No. 2001/0008827 discloses a polishing apparatus, wherein a conductive layer is polished while the surface of the substrate is brought in sliding contact with the polishing surface. A sensor, which typically comprises an eddy-current sensor, passes directly below the surface, being polished, of the substrate each time the polishing table makes one revolution. Since the eddy-current sensor is positioned on an arcuate path passing through the center of the substrate, the eddy-current sensor is capable of continuously detecting the thickness of the conductive layer as the eddy-current sensor moves along the arcuate path beneath the substrate.

U.S. patent publication No. 2002/0047705 discloses an eddy current sensor comprising a sensor coil for generating an eddy current in the conductive film, and a detector for detecting a change in the thickness of the conductive film from a change in a resistance component in impedance formed by the sensor coil and conductive film.

U.S. patent publication No. 2002/0077031 discloses a combination of eddy current sensor and optical sensors. The eddy currents cause a metal layer to act as an impedance source in parallel with a sense coil and capacitor. As the thickness of the metal layer changes, the impedance changes, resulting in a change in the Q-factor of sensing mechanism. By detecting the change in tie Q-factor of the sensing mechanism, the eddy current sensor can sense the change in the strength of the eddy currents, and thus the change in thickness of the metal layer.

U.S. patent publication No. 20010054896 discloses an eddy current based measuring technique, according to which the thickness or strength of a flat test object, in particular a web, a tape, or a layer of an electrically conducting material, is determined with the aid of at least one measuring coil through which an alternating current passes, wherein the measuring coil is arranged at a basic distance from the test object. The change of inductance and damping are evaluated via the impedance.

The prior art teach that film thicknesses of more than 0.1 $\mu$m are measurable with less than 100 MHz frequencies of AC voltage applied to a sensing coil (e.g., is the above-indicated U.S. patent publications Nos. 2001/0008827 and 2002/0047705. Most of the prior art techniques utilize means for determining a distance between the sensor and the sample—an important parameter that affects the measurement results.

SUMMARY OF THE INVENTION

There is accordingly a need in the art to facilitate contactless electrical measurements of conductive film thicknesses by providing a novel electrical measurement method and system.

The technique of the present invention provides for thickness measurements utilizing high frequencies (from 100 MHz to a few GHz) AC voltage applicable to a small sensing coil (e.g., RF coil fabricated by integrated technology). Such eddy-current measurements at high frequencies provide for decreasing the penetration of an electromagnetic wave into the film material and thus decreasing the influence of a sample holder (chuck), substrate (wafer or another semiconductor or dielectric material), and/or under-layers and structures formed from the conducting media (metals or semiconductors). Appropriate frequency or frequency range can be chosen by calculation of appropriate skin-depth taking into account interaction and attenuation of high-frequency electromagnetic wave passing through the structure (stack).

Utilization of high frequencies causes in turn the decrease in the signal changes related to the eddy-current effect. The conventional eddy-current techniques for measuring of thin films in the thickness range required for semiconductor industry (0.1–2 $\mu$m) utilizes relatively low frequencies—from several MHz to tens of MHz (US2002/0047705).

The present invention provides an alternative method for measuring required metal films (0.1–3 $\mu$m in thickness) by locating a high-frequency eddy-current probe (from 100 MHz to a few GHz) in close proximity from the sample, i.e., from several tens to several hundreds of micrometer. Due to a significantly decreased sample-to-probe distance, it is possible to measure eddy-current signals in the high-frequency range with required resolution and accuracy. Due to significantly increased frequency, the penetration of electromagnetic waves to the under-laying structures, substrate and wafer holder decreases, thus decreasing the sensitivity to undesirable layers and materials below the film and increasing "selective" sensitivity to the measured film only. Operation with increased frequencies allows for using smaller inductances for eddy-current coil and thus smaller coils improving lateral resolution of the probe. Commercial high-frequency (UHF and microwave range) coils with reduced dimensions can be used. This resolution in turn can be improved by designing high-frequency coils with magnetic-field concentrator from high-frequency ferrites.

The technique of the present invention provides for eliminating the need for controlling a distance between a sample under measurements and a measuring coil, but rather allows for measurements independent on the value of distance. The present invention also provides for correcting the measurement results for the environment effects (e.g., temperature effects). The technique of the present invention utilizes for selecting an appropriate model for analyzing measured data as well as for optimizing this model while at a calibration step (off-line).

There is thus provided according to one broad aspect of the present invention, a method for measuring in an electrically conductive film of a sample, the method comprising:

providing data indicative of a free space response of an RF sensing coil unit to AC voltage applied to the RF sensing coil;

locating said sensing coil proximate to the sample at a distance h substantially not exceeding 0.2 r wherein r is the coil radius; supplying an AC voltage in a range from 100 MHz to a few GHz to the sensing coil thereby causing generation of an eddy current passage through the conductive film; detecting a response of said sensing coil to an effect of the electric current through the conductive field onto a magnetic field of the coil and generating measured data indicative of said response; and analyzing the measured data and said data indicative of the free space measurements to determine at least one of thickness and resistance parameters of the conductive film, the method providing for measuring in conductive films with a sheet resistance $R_s$ in a range from about 0.009 to about 2 Ohm/m$^2$.

Preferably, the AC voltage frequency ranges between 200 MHz to 500 MHz. For copper films, measurable thicknesses are about 0.1–3 μm (of the skin depth order).

The utilization of high-frequency eddy-current technique requires solving such important problems, as providing an appropriate high-frequency measurement technology. (Frequently used very sensitive balanced bridge technique is difficult to realize at high frequencies even in the single-frequency mode, in frequency sweep mode, an appropriate microwave measurement technology is required); appropriate physical model of interaction between the sample (conductive film) and an eddy-current probe; appropriate algorithms for data acquisition and processing, calculation and interpretation; appropriate calibration and measured procedures; appropriate distance control technique to ensure well-controlled and reliable work of the system without any potential danger to very expensive semiconductor wafers.

As indicated above, the technique of the present invention provides for the film thickness measurements independent on a distance between the sensing coil and the film, thereby eliminating the need for measuring this distance.

One way to achieve this is to select for measurements in a given sample, by frequency sweeping an optimal value of the AC voltage frequency for said, wherein this optimal value is that at which a characteristic of the response signal is substantially independent from a value of the distance between the coil and the sample. The optimal value can be determined by carrying out a calibration stage. The calibration stage may comprise the following: determining a frequency characteristic of the coil with no sample in the vicinity of the coil (free space response of the coil); varying the frequency value and determining a value of the coil response as a function of the frequency; and analyzing the frequency characteristic and the coil response function to determine the optimal frequency value for the given sample. Preferably, the coil response value is the real part of the coil circuit impedance obtained by transformation from the reflection response ($S_{11}$).

Another way to achieve the distance independence of measurements consists of the appropriate model selection and optimization of the selected model during a calibration stage (off-line). Here, either a fixed frequency or multi-frequency approach for the model optimization can be used.

According to yet another embodiment, a ratio between inductance L and resistance R of an equivalent RLC circuit (defined by the coil and sample arrangement) is considered, which is proportional to the thickness of the conductive film.

According to another broad aspect of the present invention, there is provided a method for measuring in a copper film of a sample, the method comprising:

providing data indicative of a free space response of an RF sensing coil unit to AC voltage applied to the RF sensing coil;

locating said sensing coil proximate to the sample at a distance h substantially not exceeding 0.2 r wherein r is the coil radius; supplying an AC voltage in a range from 200 MHz to 500 MHz to the sensing coil thereby causing generation of an eddy current passage through the conductive film; detecting a response of said sensing coil to an effect of the electric current through the conductive field onto a magnetic field of the coil and generating measured data indicative of said response; and analyzing the measured data and said data indicative of the free space measurements to determine at least one of thickness and resistance parameters of the conductive film, the method providing for measuring in copper films with a thickness d in a range from about 0.01 μm to about 3 μm.

According to another broad aspect of the present invention, there is provided a system for measuring in an electrically conductive film of a sample, the system comprising:

an RF sensing coil operable to generate a magnetic field thereby causing an eddy current passage through the conductive film located proximate to the coil;

an AC voltage generator connected to said sensing coil, said AC voltage generator being operable to generate AC voltage of a frequency ranging between 100 MHz and a few GHz;

a detector, which is connected to the sensing coil and operable to detect an effect of the electric current passage through the conductive field onto a magnetic field of the coil and generate a corresponding response signal;

a control unit connectable to the AC voltage generator to operate it and connectable to the detector to receive and analyze the response signal, the control unit operating said AC voltage generator to provide at least two operating frequencies of the AC voltage within said range and thereby determining a value of said response as a function of the frequency, and utilizing calibration data to analyze said function and determine at least one of thickness and conductivity of the conductive film.

The technique of the present invention can advantageously be used in the manufacture of semiconductor devices for feed-back and feed-forward control of such processes as electroplating, CMP, and PVD, as well as general mapping (one dimensional or two-dimensional) of the topography of a patterned layer. This may for example be used for die mapping in a semiconductor wafer. The present invention also provides for automatic recipe design to be further used in electrical measurements of the layer thickness.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 3B–3D illustrate top, bottom and side views, respectively, of a high frequency ECS with ferrite core suitable to be used in the system of the present invention;

FIGS. 121A–12D exemplify the application of the technique of the present invention for metal thickness measurement within patterned areas;

DETAILED DESCRIPTION OF THE INVENTION

Figure 1:
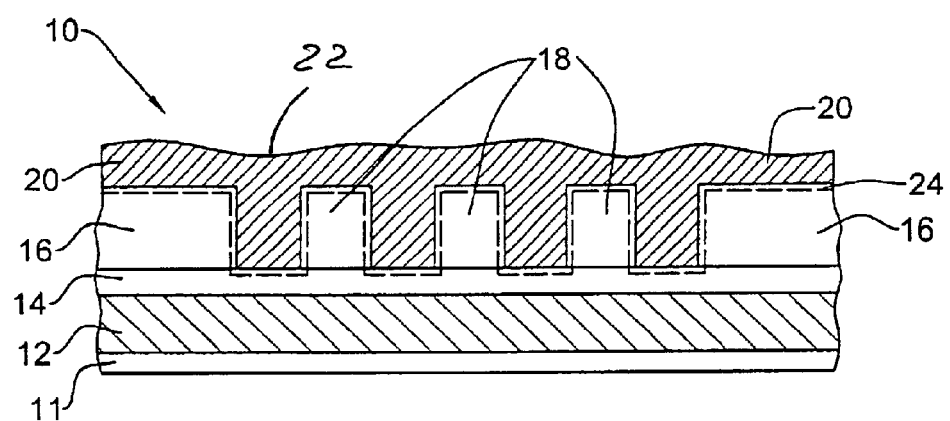
FIG. 1 illustrates a cross section of a typical copper-based wafer structure, utilizing copper interconnects patterned with a known dual Damascene process, prior to the application of a CMP process to the structure.

FIG. 1 exemplifies a structure of the kind requiring thickness measurements. This is a copper-based wafer structure (utilizing copper interconnects patterned with a known dual Damascene process) prior to the application of a CMP process to the structure.

Figure 2:
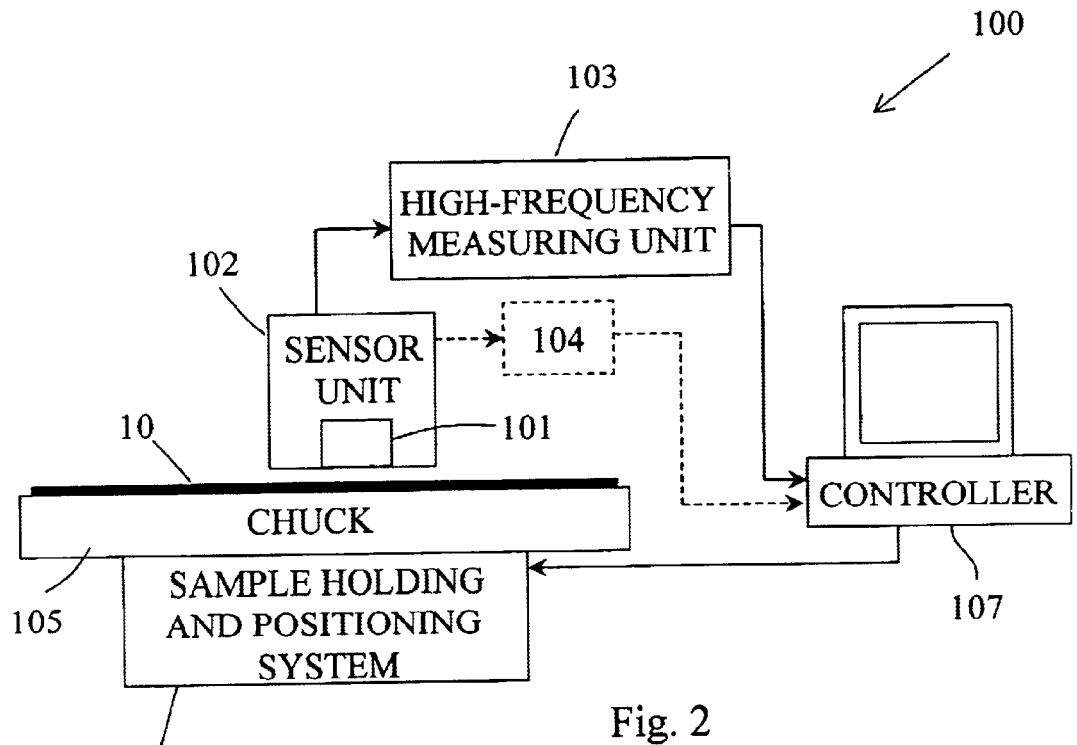
FIG. 2 schematically illustrates a system according to the invention for thin conductive layer measurements.

Referring to FIG. 2, there is illustrated by way of a block diagram a measurement system 100 of the present invention applied to a sample 10 (semiconductor wafer). The system 100 comprises a sensor unit 102 including a high-frequency eddy-current sensor 101; a high-frequency (microwave) measuring unit 103 operable to provide such necessarily functions as high frequency vector signal measurements, A/D conversion and buffering, data transfer to a controller by an appropriate bus and protocol; a sample bolding and positioning system 106, which is an XYZ or RθZ stage associated with a sample holder (chuck) 105 and is operable for positioning a measurement site exactly below the eddy-current sensor; and a controller 107, which is a computer system that controls such operations as wafer-alignment, control of the sample positioning stage, measurement procedure, i.e., carries out data acquisition, preprocessing (if required), main data processing and interpretation, data representation. Optionally provided in the system 100 is an optical sensor (including for example a CCD camera), which is not specifically shown and an image processing module 104 (shown in dashed lines), that supports appropriate auto-focus and alignment procedures, video-data acquisition and buffering, transfer of video-data to controller. The module 104 can be implemented as a specialized card (video-acquisition card) embedded into the controller 107.

In the example of FIG. 2, the sensor unit (probe) 102 is located at a fixed position above the sample and the precise XYZ or RθZ sample moving stage is located below the sensor unit. This provides for ensuring non-contact measurements and preventing collision between the sample and sensor and possible sample damage, as well as reducing footprint of the system 100 and ensuring required accuracy and reliability of the sample positioning system. It should be noted, although not specifically shown, that the following alternative configurations are possible for the close proximity high-frequency eddy-current measurement system of the present invention:

1. The so-called "inverted" configuration can be used, in which the sensor unit 102 is located below the sample with holder and positioning system.

2. The high-frequency measuring unit 103 can be realized in compact custom-made form (box) with a low frequency data output being provided via standard plain flexible cables or any other type of communication that ensures reliable data translation to the main controller 107 after the high-frequency signal measuring and conversion to digital form. In this case, the sample 10 supported by the holder 105 can be maintained at a fixed position, and the compact sensor unit 102 with the measuring unit 103 can be mounted on an appropriate sensor positioning system (stage) that will provide appropriate relative position of the sensor and the sample. Due to the low-frequency digital output, such an embodiment does not require a high-frequency flexible wiring that is very critical in case of vector reflectivity measurement mode (both, magnitude and phase measurement). A high-frequency microwave wiring is very sensitive to any even negligible bending, so the system accuracy will be strongly affected by the sensor movement in this case. A low-frequency digital output solves this problem: it can be easily realized without any affect on the system accuracy due to the sensor movement.

3. Mounting the compact custom-made high-frequency measuring unit 103 on an appropriate stage makes possible another safety configuration: the stationary mounted sample 10 on the sample holder 105, and the sensor unit 102 with its high-frequency measuring unit 103 mounted on an appropriate stage below the sample 10.

It should be noted that with the moving sensor unit 102, there exists the problem of flexible wiring between the optical sensor. (CCD-camera) and the video-data acquisition module (card). This problem can be solved in two ways. First, in case the stage can ensure a precise relative location of the sensor unit and the sample (global alignment case and high precision Z-stage), the need for image processing unit is completely eliminated. Otherwise, due to relativity low sensitivity of a video signal to the RF-cable bending, flexible RF-cable wiring can be used, or, in case of non-limited throughput, even lower bandwidth protocols and standards like USB camera connection, etc., that is not affected by wiring bending.

Figure 3A:
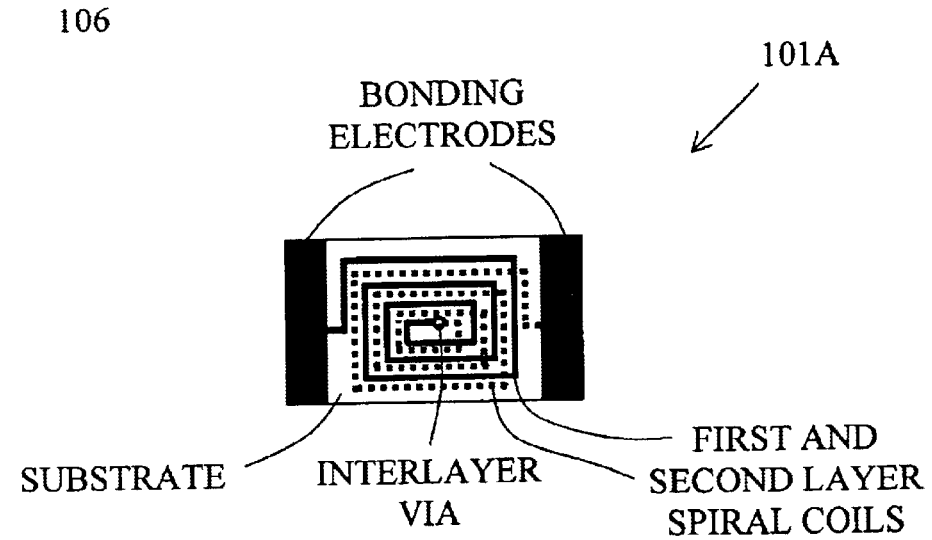
FIG. 3A is an example of a coil sensor suitable to be used in the system of the present invention.

FIG. 3A exemplifies a close proximity high-frequency eddy-current sensor 101A suitable to be used in the system of the present invention. The sensor 101A is based on the microwave two-layer thin-film inductance, and comprises first and second layer spiral windings formed in a substrate and interconnected by means of interlayer via and a pair of bonding electrodes.

Due to the close-proximity measuring mode, the efficiency of a plain (e.g., spiral) eddy-current coil (sensor) is much higher than that of a typically used long solenoid coil. Indeed, with the typical coil, only the closest to the sample coil windings efficiently interact with the sample, thus reducing an effective eddy-current interacting part (inductivity) of the coil. Hence, a one- or two-layer plain spiral coil is preferred as the close proximity high-frequency eddy-current sensor. The measured eddy-current signal (change) is proportional to the coil inductance and thus to the coil size. On the other hand, lateral resolution (and measuring site size) depends also on the coil size: the lateral resolution improves and the measuring site size decreases with a decrease of the eddy-current sensor size. The overall measuring system performance is a result of some kind of compromise between the requirement to the signal to noise level (higher inductances and thus larger coils), and the requirements to lateral resolution and measuring site size (the smaller the better). Such an eddy-current coil may be made by appropriately applying photolithography or the like process to form a required plain spiral coil. Alternatively, some kinds of commercial UHF (ultra high-frequency) or microwave inductances may be used. For example, thin-film compact inductances NLU 160805 T-47NG commercially available from TDK. It has a 47 nH inductance and a relatively small size (1.6×0.8 mm) of the overall projection of the sensor measuring side on the sample plane. The effective size of a two-layer spiral coil is even less, due to the fact that it occupies only a part of the surface of the substrate, there are also electrodes for its connecting and bonding. Hence, the eddy-current coil effective size is about 0.7×0.7 mm, and it has two spiral windings in two layers. As the sensor is fabricated by the thin film technology, a distance between the two layers (two windings) can be as small as desired, and consequently both layers of the sensor interact effectively with the sample, thus providing required sensitivity. Using a special design of these microwave inductivity coils, very high values of a self-resonant frequency (SRF) can be realized even for such high-inductivity coils as 1.5 GHz and higher. Such a coil may also be specialty designed based on required lateral resolution spot size and required signal level and thus coil inductance. Any other custom-made plain coil with required parameters can be used.

A high-frequency ECS with ferrite core can be used. This allows for reducing the coil dimensions, using the core as a concentrator of a magnetic field thus significantly improving spatial resolution and signal-to noise ratio, and allows for fabricating the coil integrated with a PCB (print circuit board) with prominent ferrite core pasted into the PCB hole surrounded by the coil. There are several types of ferromagnetic materials (ferrites) appropriate to be used as the ferrite core. Magnetic permeability $\mu$ of these ferrites at high frequency is at least 10. Hence, a number of coil turns can be reduced for the same coil inductance, even to the single turn coil, or alternatively, the coil size can also be reduced, thus reducing the ECS size and improving its lateral resolution. Of course, both methods can be used in combination.

FIGS. 3B–3D illustrate top, bottom and side views, respectively, of a high frequency ECS with ferrite core. Here, the coil is realized as a single-turn coil fabricated directly on a PCB together with appropriate transmission lines or wiring, and a ferrite core is pasted to the hole in this PCB and appropriately fixed, e.g, by glue. In order to reduce the parasitic capacitance between the transmission line/wiring and the measuring sample (conductive film), the coil and transmission lines/wiring are fabricated on the upper side of the PCB, and the bottom size of the PCB forms a ground plane (except for the place bellow the ECS itself), thus screening this wiring from the sample. The ferrite core maybe cylindrical, or cylindrical with conical heard at the measuring end for improving the lateral resolution.

Figure 4:
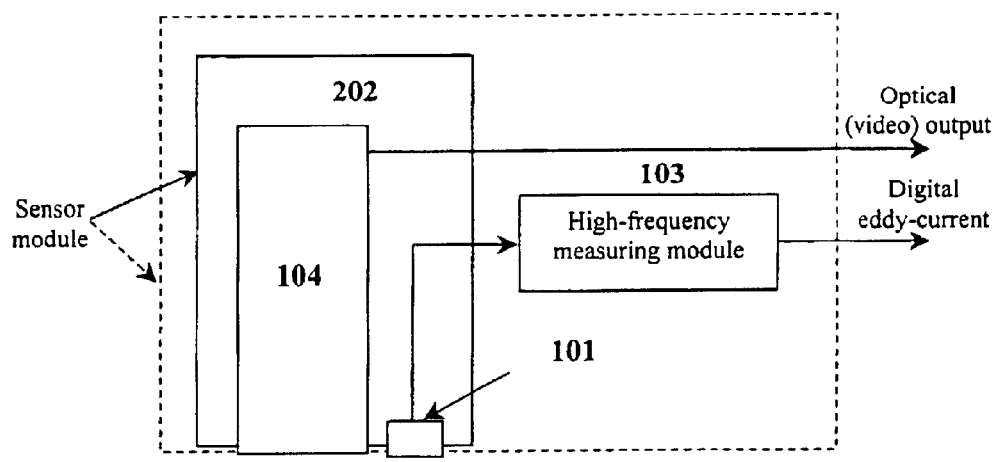
FIG. 4 schematically illustrates a sensor unit of the system of FIG. 2.

FIG. 4 exemplifies a sensor unit 202 suitable to be used in the system of the present invention. The sensor unit 202 incorporates the close proximity high-frequency eddy-current sensor 101, and an optical distance control and site alignment sensor 104. In the present example, a compact high-frequency measuring unit 103 is located outside the unit 202, and the entire arrangement including all these elements is mounted for movement with respect to the sample. Alternatively, the custom-made compact high-frequency measuring module 103 can be incorporated within the sensor unit 202, as shown in dashed lines. The optical sensor 104 may utilize different measuring techniques, e.g., laser interferometer, laser displacement sensor (based on a change in the angle of reflected light angle or on a change in the intensity of reflected light different kinds of auto-focus arrangement (e.g., like those typically used in CD-players). For example, the optical sensor unit incorporates a CCD-camera, optical objective with appropriate optical and mechanical components, and utilizes the auto-focus technique using one or two grids as disclosed in U.S. Pat. No. 5,604,344, assigned to the assignee of the present application. Due to the inevitable spatial shift between the axes of the eddy-current sensor 101 and the optical distance control sensor 104, an appropriate boresight measurement technology can be used. Due to the image processing technology, the optical sensor channel also serves such an important function as alignment of the measuring site for patterned samples (wafers). For normal functioning of boresight technique, it is important to ensure a fixed relative position of the axes of both the high-frequency eddy-current sensor 101 and the optical distance control and site alignment sensor 104. This requirement can be met by utilizing integration of both sensors within the common module 202. When utilizing a custom-made compact high-frequency measuring unit 103, this common module can incorporate also the measuring unit 103, thus minimizing the influence of their possible relative movement. In order to improve the system performance and to decrease additional overtravel caused by spatial separation between the eddy-current and distance control sensors 101 and 104, the distance control sensor 104 is as small as possible. The design of the distance control sensor 104 and coil 101 can be such that that distance control sensor 104 will act through the coil 101, thus decreasing a possible distance measuring error, for example, by use of a laser interferometer with beam passing through the appropriate hole in the eddy-current coil 101.

Figures 5A, 5B:
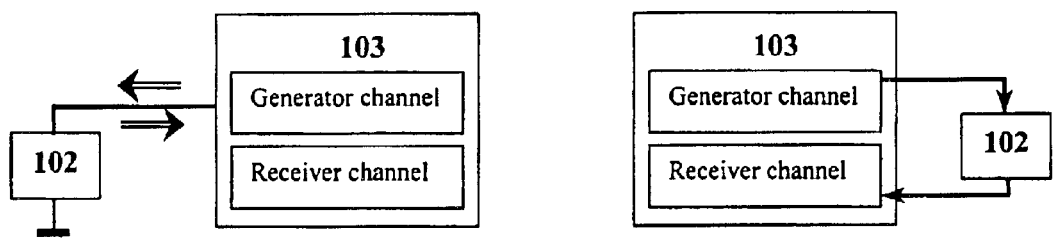
FIGS. 5A and 5B illustrate the reflection and transmission modes, respectively, of the operation of a high-frequency (microwave) measuring unit of the system of FIG. 2.

FIGS. 5A and 5B illustrate the reflection and transmission modes, respectively, of the operation of the high-frequency (microwave) measuring unit 103. The close proximity high-frequency eddy-current sensor 101 (as any other eddy-current sensor) changes its parameters depending on the presence of a conducting sample placed near the sensor 101, on its conductivity (sheet resistance) and on the separation (distance) between the sensor and the sample. Presence of conducting media causes the change in both the real and imaginary parts of the effective impedance of the sensor (coil). Thus, the measuring unit 103 has to be able to measure these changes with required accuracy and reliability.

A high-frequency range of measurements causes introducing of a specific measurement technique related to the microwave measurement technology. The standard voltage and current measurement technique is inapplicable in this frequency range. An alternative microwave technology utilizes the soiled "scattering parameters measuring". Any simple or complicated component and its interaction with other components or modules can be described by the set of its scattered parameters (S-parameters); the measured object is usually called Device Under Test (DUT). This set describes unambiguously interaction of a high-frequency (microwave) signal with this component—reflection from the input and/or output interfaces, signal transmission passing) in forward and backward directions as well as the change in the DUT equivalent impedance change that causes the change of appropriate S-parameters.

According to the present invention, the measuring unit 103 measures two main S-parameters: $S_{11}$ in reflection mode (a ratio between reflected and incident signals) and $S_{21}$ in transmission mode (a ratio between the passing and incident signals). In terms of DUT, the close proximity high-frequency eddy-current sensor can be connected in both the reflection and transmission modes, as shown in FIGS. 5A and 5B. In the example of FIG. 2, the reflection mode configuration of FIG. 5A is used, but the same sensor can be easily used in the transmission mode by appropriate wiring (FIG. 5B). In both cases, the measuring unit 103 includes an appropriated signal source (a generator with a buffer amplifier) and a measuring channel that tracks changes in the magnitude and phase of the incoming signal relative to the incident signal. In reflectance mode, this measuring unit additionally separates a signal reflected from the DUT from a signal directed from the generator to the DUT, both signals passing through the same signal line (FIG. 5A). Due to the symmetry of the sensor, it is sufficient to realize only the one-direction transmission mode, thus significantly simplifying the entire process.

An RF source generates an RF sweep in some predefined frequency range. This energy is guided inside a transmission line to the coil. As a result of the RF field interaction with the coil or with the coil-with-sample, some energy is reflected back to a waveguide (RF wire) and is directed by a direction coupler or circulator to a vector (phase and amplitude) detector. This detector extracts the ratio between the amplitude of the reflected and input waves, and a phase difference $\phi$ therebetween.

The complex number is composed of the real and imaginary parts: $S_{11}=S_{11,real}+j*S_{11,images}$ where $S_{11,real}=A \cos \phi$, and $S_{11,image}=A \sin \phi$. The complex number $S_{11}(f)$, which is a function of frequency, is delivered to a data processing unit (computer) for further processing.

The measured complex function $S_{11}$ is related to the coil's impedance as follows:

$$S_{11}(f) = \frac{Z_{coil}(f) - Z_0}{Z_{coil}(f) + Z_0}$$

where $Z_0$ is the characteristic impedance of the transmission line and is usually real and equal to 50Ω. It should be noted that $Z_{coil}(f)$ is also a function of frequency f and is complex-valued.

The microwave Vector Network Analyzer (VNA) model ZVM commercially available from Rohde&Schwarz can be used as the high-frequency measuring unit 103. This device is capable of measuring the full set of S-parameters and presenting the measured data in several useful formats: as the magnitude and phase of the related S-parameter, or alternatively, its real and imaginary parts; as the so-called Standing Wave Ration (SWR); as an equivalent DUT impedance related to the high-frequency and microwave transmission line impedance 50 Ohm. Appropriate changes in the real and imaginary parts of the sensor's impedance are directly related to the eddy-current interaction between the sensor and the sample. The VNA model ZVM commercially available from Rohde&Schwarz can operate in both the single frequency mode and the frequency sweep mode, while providing all necessary system corrections required due to the additional magnitude and phase errors caused by communication lines and wiring between the sensor and the measuring module.

Figure 6:
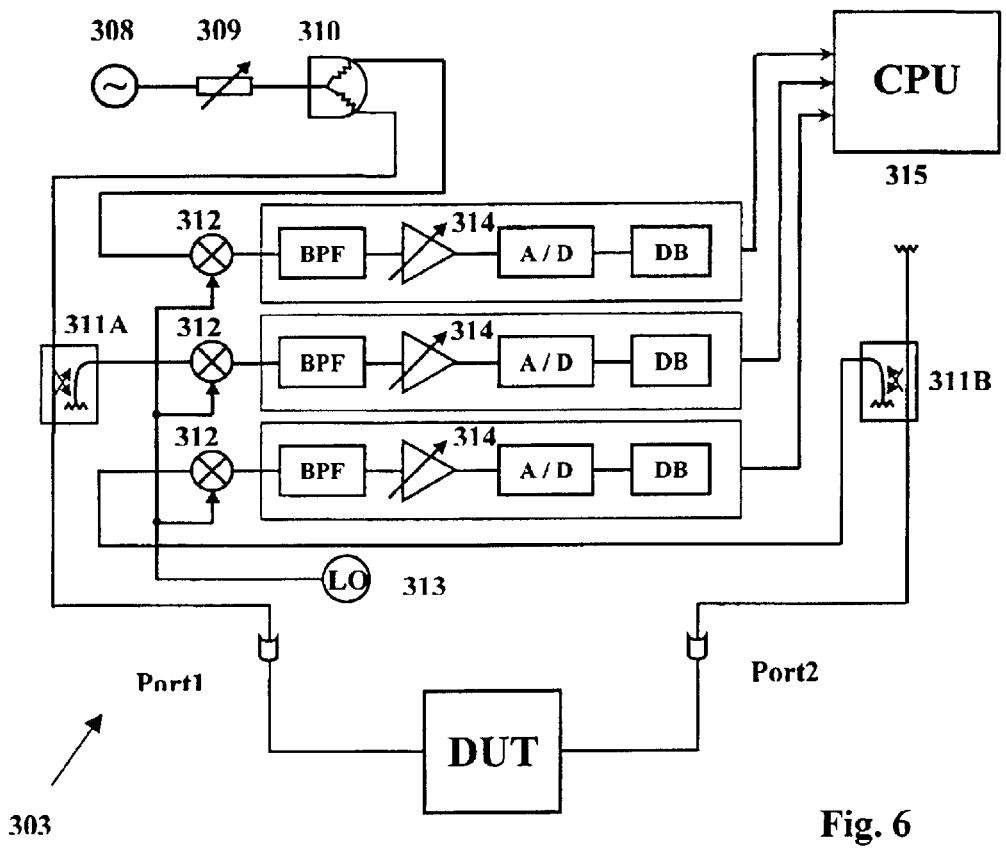
FIGS. 6 and 7 exemplify appropriate measuring scheme that can be realized in a measuring unit of the system of FIG. 2, while operating in, respectively, multi-frequency and single-frequency modes.

FIG. 6 exemplifies an appropriate measuring scheme that can be realized also as custom-made measuring unit 303. The measuring scheme utilizes a signal source 308 which is a stabilized and buffered frequency synthesizer operating with a single frequency mode or sweep mode; a programmable attenuator 309 required for adjustment of the source output power; a power divider 310; directional couplers 311A and 311B (or equivalent active/passive bridges); mixers 312; a local oscillator 313 used for signal conversion by the mixers 312; and three identical channels 114. Data acquired from all the channels 314 is received and processed by a processor unit 315 (CPU) that also performs all appropriate control functions.

The power divider 310 serves for splitting the source signal into two parts, one being applied to the DUT (which is corrected to the measuring module via Port1 and Port2) and the other being used as a reference channel in order to calculate appropriate S-parameter (incident signal for both $S_{11}$ and $S_{21}$ parameters). With regard to the directional couplers 311A and 311B, it should be understood that both couplers are used when the measuring unit 303 operates in the transmitting mode, and only the coupler 311A is used when the measuring unit operation in the reflective mode. The mixers 312 are used for conversion of the wide-band measured signals (incident/reference, reflected and transmitted) to some intermediate frequency (or frequency band), followed by signal and data processing. In the present example, considering both the reflection and transmission mode of operation three identical channels 114 are used, but it should be understood when either one of these modes is used only two such channels are provided. These channels are usually called "amplifiers" and used for consequent signal processing, conversion to digital data stream and its buffering before consequent data processing and representation, each channel operating only with a corresponding signal type—incident (as a reference), reflected and transmitted wave, each channel consisting of an appropriate band-pass filter (BPF), a variable-gain amplifier, an analog-to digital converter (A/D) and its data buffer (DB).

Figure 7:
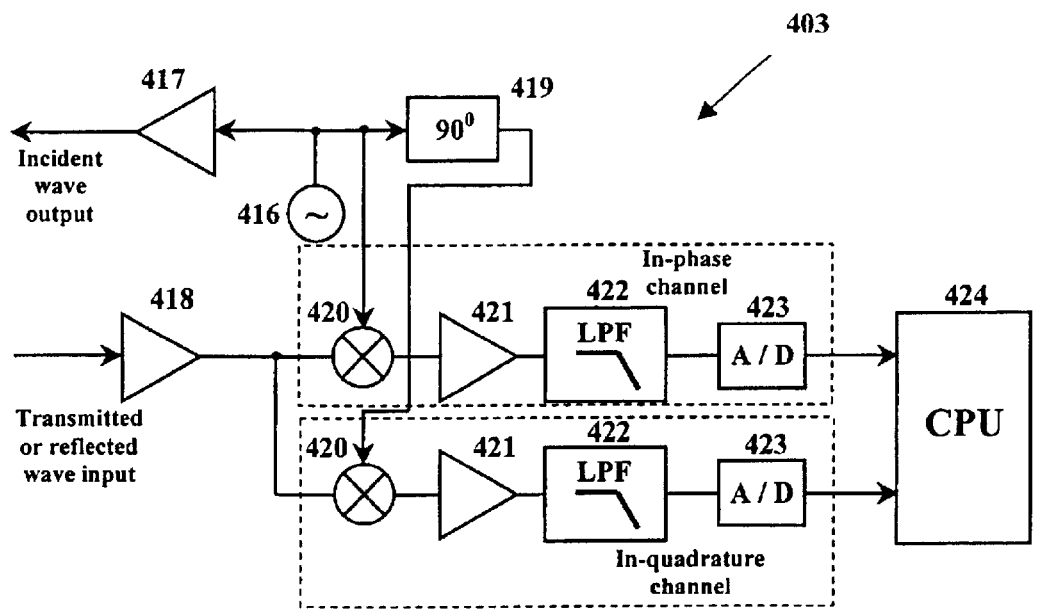

FIG. 7 more specifically illustrates a measuring unit 403 configured for single frequency mode operation. This embodiment enables simultaneous measurement of two orthogonal components of an input signal—in-phase and in-quadrature, thus enabling, after appropriate transformation, simultaneous measurement of the magnitude and phase of the input signal, or of the real and imaginary parts of the input signal. This embodiment can be utilized in both the reflection and transmission mode of measurement (FIGS. 5A and 5B, respectively). In the reflected mode, this configuration also utilizes an appropriate incident/reflected separated element (directional coupler, active/passive bridge, etc.). The measuring unit 403 thus includes a high-frequency source 416 (stabilized and buffered frequency oscillator); a power amplifier 417; a preamplifier 418; a 90° phase-shifter 419; two mixers 420; two amplifiers 421; two low-pass filters 422 (LPF); two analog-to-digital converters 423 (A/D) with appropriate buffers; and a processor unit 424 (CPU) that provides data processing and representation. As indicated above, for the reflective mode of operation, the measuring unit further comprises a directional coupler 424 or any other separating element. Two parallel measurement channels, each formed by the mixer, amplifier, LPF and A/D, serve for measuring the in-phase and in-quadrature signals, respectively.

As indicated above, the measured signal is the amplitude and phase of the reflection coefficient of the RF signal, which is injected into the coil, while in the vicinity of the conductive sample. The injected RF signal may be of a single frequency, or a multi-frequency range or a sweep of frequencies. In case the single frequency is used, the amplitude and phase of the reflection coefficient are recorded for that frequency. In the case of multi-frequency or sweep, the amplitude and phase of the reflection coefficient are recorded for each frequency.

Figure 8A:
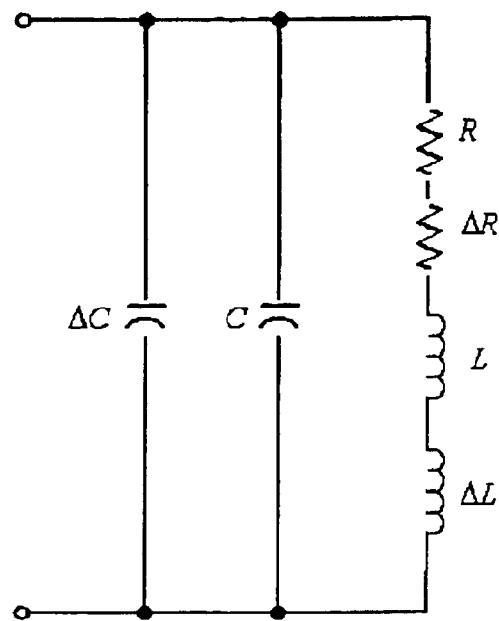
FIGS. 8A and 8B illustrate equivalent RLC circuits of the coil with sample arrangement.

Considering the experimental and theoretical analysis of a filamentary circular coil, the impedance of the coil may be roughly described by an RLC circuit shown in FIG. 8A. In this circuit, elements R, L and C constitute the resistance, inductance and capacitance of the coil in free-space (far away from a conductive sample), and $\Delta R$ and $\Delta L$ are the added resistance and inductivity when the coil is brought to the vicinity of the conductive sample. Both theory and measurements show that $\Delta L$ depends mostly on a distance h between the coil and the sample and only weekly depends on the thickness d of the sample (provided that the sample is thick enough, namely, $d>2\delta^2/h$, wherein $\delta=1/\sqrt{\omega\mu_0\sigma}$ is the skin depth of metal whose conductivity $\sigma$ at angular frequency $\omega$, and $\mu_0$ is the magnetic permeability of vacuum), while $\Delta R$ depends on both of these parameters.

For a filamentary circular coil (which is a reasonable approximation to the shape of an actual coil), the impedance change in the presence of the sample is given by $$\Delta Z \approx j\omega\pi N^2 r_0 \mu_0 \left\{ -F\left(\frac{h}{r_0}\right) - \frac{\delta}{r_0\sqrt{j}} \frac{1+\exp\left(-2\frac{d}{\delta}\sqrt{j}\right)}{1-\exp\left(-2\frac{d}{\delta}\sqrt{j}\right)} \frac{dF}{dx}\bigg|_{x=h/r_0} \right\}$$

wherein $r_0$ is the coil's radius, N is the number of turns in the coil, and F(x) is the function:

$$F(x) \equiv \frac{(1+2x^2)K\left(\frac{1}{\sqrt{1+x^2}}\right) - 2(1+x^2)E\left(\frac{1}{\sqrt{1+x^2}}\right)}{\pi\sqrt{1+x^2}}$$

wherein E(x) and K(x) are the elliptic integral functions.

Figure 8B:
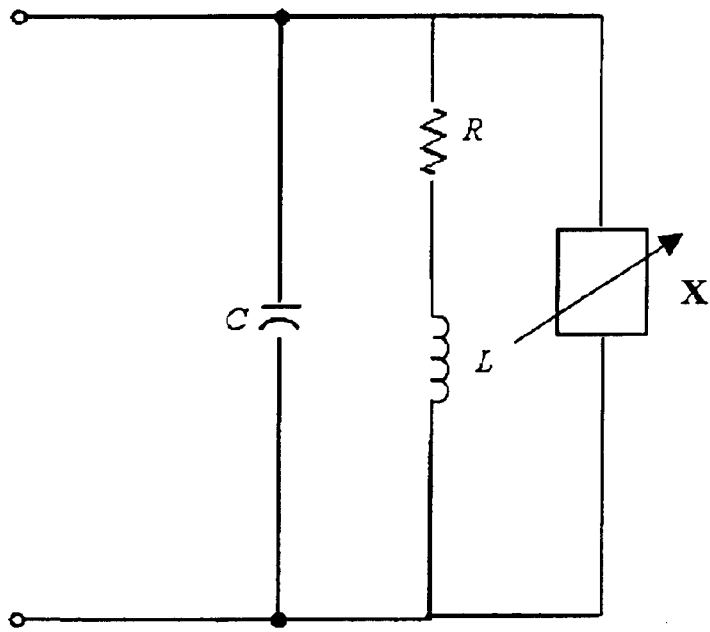

FIG. 8B illustrates an equivalent coil circuit (detector module) useful for frequency mode measurements in the device of the present invention. The system measures $S_{11}$ either by measuring the real and imaginary parts of the impedance, or by measuring the amplitude and phase of the reflected signal (as described above). Placing a conductive sample in proximity to this coil circuit causes small changes in the values of R, L and C. It has been found that the real part Re(Z) of the samples' impedance has crossing with the real part Re(Z) of the "free space" coil at a finite distance. A similar effect is observable for imaginary part Im($S_{11}$) of $S_{11}$, but in a different frequency range. A variable reactance X of the detector module can be adjusted, so that the crossing points of the samples with a wide range of resistivities can be differenced.

According to another preferred embodiment of the invention, the technique of the present invention utilizes R and L parameters, while allowing for eliminating the need for utilizing the C parameter in a model used for thickness measurements. This is achieved by selecting an appropriate model and optimizing the model during an off-line calibration stage. As for the environment parameters, they can be corrected (calibrated) by using the free-space measurements (i.e., with no sample in the vicinity of the measuring coil).

The following is the description of the basic principles of this embodiment and possible ways (models) of implementation.

The measured complex function $S_{11}$ (which is a function of frequency) is transformed into coil impedance, which is also frequency dependent, according to the equation:

$$Z_{coil}(f) = Z_0 \frac{1+S_{11}(f)}{1-S_{11}(f)}$$

wherein $Z_0$ is known (usually 50$\Omega$).

Then, preferably, the following real function F of R, L and C is defined:

$$F(R, L, C) = \frac{1}{N_f} \sum_f \left| Z_{coil}(f) - \frac{(R+j2\pi fL) \cdot \frac{1}{j2\pi fC}}{R+j2\pi fL + \frac{1}{j2\pi fC}} \right|^2$$

wherein $N_f$ is the number of frequency measured, summation goes over all frequencies f, j is the complex constant and | | is the modulus function.

Now, the function F is searched for a minimum over the three-dimensional space of R, L, and C. This is subsequently used to eliminate the temperature effects on measured data, as well as to determine a difference between free-space and with-sample measurements, which difference depends on the sample thickness (d) and a distance (h) between the sample and the measuring coil. This search can be done by any minimum search algorithm such as Simplex, Marquardt-Levenberg, etc. The output of this routine are values of R, L and C in which F attains its minimal value. This conversion and minimization routine is performed for both the free-space measurement ($Z_{fs}$) yielding one set of R, L and C values and the sample measurement ($Z_s$) yielding another set of these parameters.

By knowing the impedance for a set of frequencies and knowing the equivalent RLC circuit, a fitting algorithm can be performed and the "fitted" R, L and C parameters of the equivalent circuit can be obtained. For a single frequency mode, the C component is assumed to be fixed since the effect of the eddy current on this component is negligible.

Generally, $\Delta R$ ($R_s-R_{fs}$) and $\Delta L$ ($L_s-L_{fs}$) contain all the needed information about the thickness. Preferably, however, several more steps are required to eliminate the thermal effects, as well as distance non-repeatability effects. The fitted RLC parameters of both sample and free-space taken at similar thermal conditions are fed into a correction algorithm block that corrects for both thermal and distance non-repeatability effects. The thermal correction is implemented by using the free-space RLC and a calibrated free-space RLC that was measured in a controlled thermal environment. The thermal change can be determined from the difference between these two sets of RLC component, and then a correction is applied to the free-space RLC and to the sampled RLC. This provides the eddy current RLC components with thermal correction. The corrected sample RLC values are then processed by using a translation algorithm that outputs the probable sample thickness value.

It should be noted that, preferably, at least three independent measurements are required to extract three unknown parameters R, L and C. Since each frequency carries two independent parameters (the real and imaginary part of the reflectance), at least two frequencies are required in this scheme. The use of a number of frequencies is likely to filter out random noise. Generally, if the C parameter is known, operation with a single frequency would be sufficient for the thickness measurements. The so-obtained eddy current RLC components, preferably with thermal correction, can be used for determining the thickness of a layer under measurements.

The entire procedure includes off-line stages, including calibration and model optimization ("fit to a model" interpretation), and on-line measurements (normal operation) on a sample. The on-line measurements can also be done in several possible ways, as will be described further below.

The Off-line Calibration Procedure Includes the Following:

Environment effect (e.g., temperature effect) monitoring stage. A set of known samples having different thicknesses are measured under controlled temperature environment at various frequencies and heights for each sample. This measurement session preferably also includes a free-space measurement. The free-space measurement is used to monitor the effect of temperature changes, and both the free-space and with-sample measurements are used to monitor the temperature dependence of the with-sample sample measurements. Then, using a certain calibration algorithm, temperature correction coefficients for both free-space and with-sample modes are determined to thereby enable temperature correction of measured data.

Temperature correction stage: Once temperature effect is characterized and temperature-free-space correlation is known, an algorithm which retrieves temperature from the free-space measurement is established, and a measurement correction algorithm is used that corrects the incoming measurements to reproduce the measurements corresponding to a certain specified nominal temperature $T_0$. It should be noted that using a thermometer during the normal system operation, allows for eliminating any temperature retrieval algorithm processing.

Figure 9A:
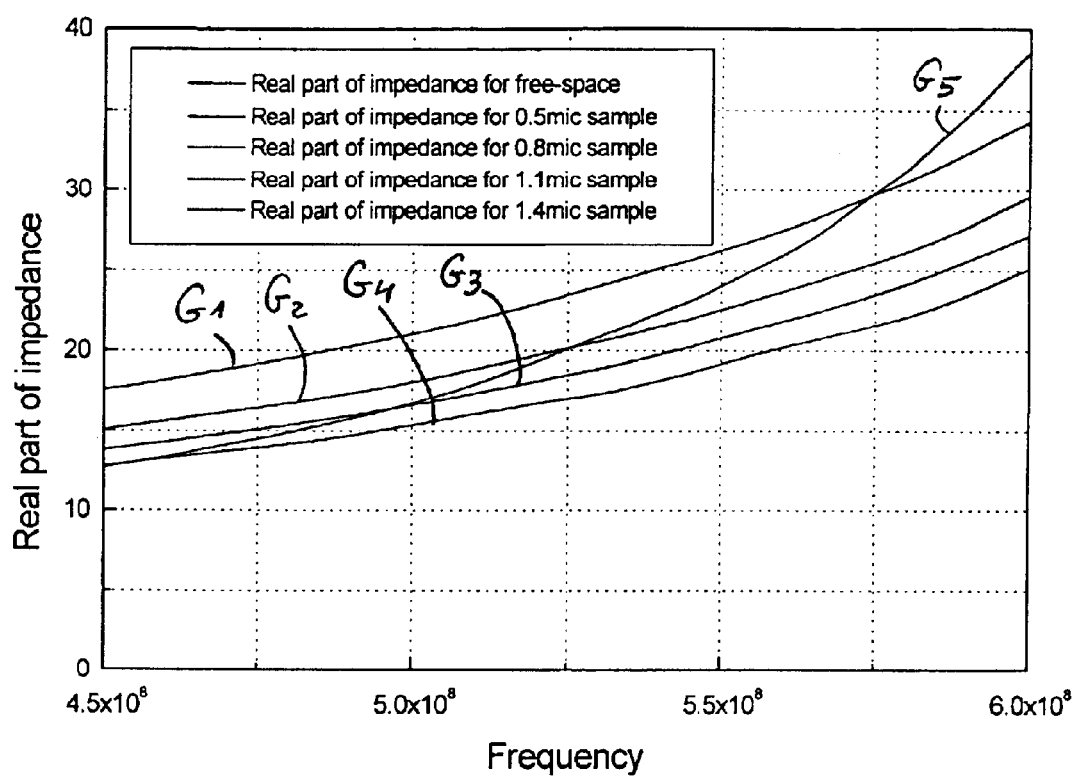
FIG. 9A schematically illustrates the principles of a fit to model (model optimization) off-line stage according to one example of the invention.

Fit to a Model (or Model Optimization) Stage—FIG. 9A.

This process is aimed at finding the model parameters that best fit the measured results. In this stage, the corrected measurements (i.e., corresponding to the nominal temperature) for all the thicknesses and heights are translated to impedance (according to the above equation connecting the measured signal (reflectance $S_{11}$ and/or impedance $Z_{coil}$). The so-obtained impedance values are then fitted to an RLC model (as explained above), and the eddy current induced resistance $\Delta R_{eddy}$ and inductance $\Delta L_{eddy}$ (or alternatively, the eddy current induced impedance $\Delta Z$) are evaluated for each sample thickness $d_j$ and sample-probe height $h_j$. These results are processed by an appropriate algorithm which minimizes the difference between the measured impedance $\Delta Z$ and a simulated impedance $\Delta Z^{sim}(d_i, h_j, f, r_k, \sigma, \Delta h)$. The latter depends on d and h and also on the model that is used for simulation. The model is suitably designed taking into account the measured signal dependency on the coil loop radii $r_k$, frequency f, sample conductivity $\sigma$ and sample-probe offset $\Delta h$ which may occur between the measured height-probe distance and the actual distance.

The merit-function, which is minimized, is defined as $$MF(r_k, f, \sigma, \Delta h) = \sum_j \sum_i |\Delta Z^{meas}(d_i, h_j) - \Delta Z^{sim}(d_i, h_j; r_k, f, \sigma, \Delta h)|^2$$

and a minimum search algorithm is used to find the optimal model parameters.

One possible model example for determining $\Delta Z^{sim}$ utilizes modeling the coil as a collection of planar concentric circular rings parallel to the sample's surface. In this case, the equation for the vector potential $\overline{A}$ (from which the magnetic field is derived via $\overline{B}=\overline{\nabla}\times\overline{A}$) is given by:

$$\nabla^2 \overline{A} = -\mu \overline{J} + \mu\sigma \frac{\partial \overline{A}}{\partial t} + \mu\varepsilon \frac{\partial^2 \overline{A}}{\partial t^2} + \mu \overline{\nabla}(1/\mu) \times (\overline{\nabla} \times \overline{A})$$

wherein $\mu$ is the magnetic permeability of the media, $\partial$ its dielectric real constant, $\sigma$ its conductivity and $\overline{J}$ is the current density source.

In this model, the part of the impedance contributed by eddy current (the impedance difference between the impedance without the sample and the impedance with the sample) is as follows:

$$\Delta Z \equiv Z_{kint} =$$

$$j\sigma\pi\mu_o \sum_{m=1}^{n} r_m \sum_{k=1}^{n} r_k \int_0^\infty \frac{\alpha}{\alpha_o}[R_o(\alpha)\exp(-2\alpha_o h)]J_1(\alpha r_k)J_1(\alpha r_m)d\alpha$$

from which the resistance difference $\Delta R$ and the inductivity difference $\Delta L$ are given by:

$$\Delta R = \text{Re}(\Delta Z)$$

$$\Delta L = \frac{\text{Im}(\Delta Z)}{\omega}$$

and $J_1(\ )$ is the Bessel function of the first kind.

The above equation applies to the response of the coil to a sample made of several layers of materials with different electrical properties $\mu_1$, $\sigma_{-1}$, $\epsilon_1$ and thicknesses $h_1$. $R_0(\alpha)$ is defined recursively (starting with the lowest layer—the substrate) via $$\frac{\alpha_n}{\mu_n}\frac{1-R_n(\alpha)}{1+R_n(\alpha)} = \frac{\alpha_{n+1}}{\mu_{n+1}}\frac{1-R_{n+1}(\alpha)\exp(-2\alpha_{n+1}h_{n+1})}{1+R_{n+1}(\alpha)\exp(-2\alpha_{n+1}h_{n+1})}$$

where for the substrate $R_s=0$ and $h_s=0$).

Also, $$\alpha_1(\alpha) \equiv \sqrt{\alpha^2 + \omega \mu_i (j\sigma_{1-\omega\epsilon_i})}$$

wherein $R_{eddy} \equiv \Delta R$ and $L_{eddy} \equiv \Delta L$.

Figure 9B:
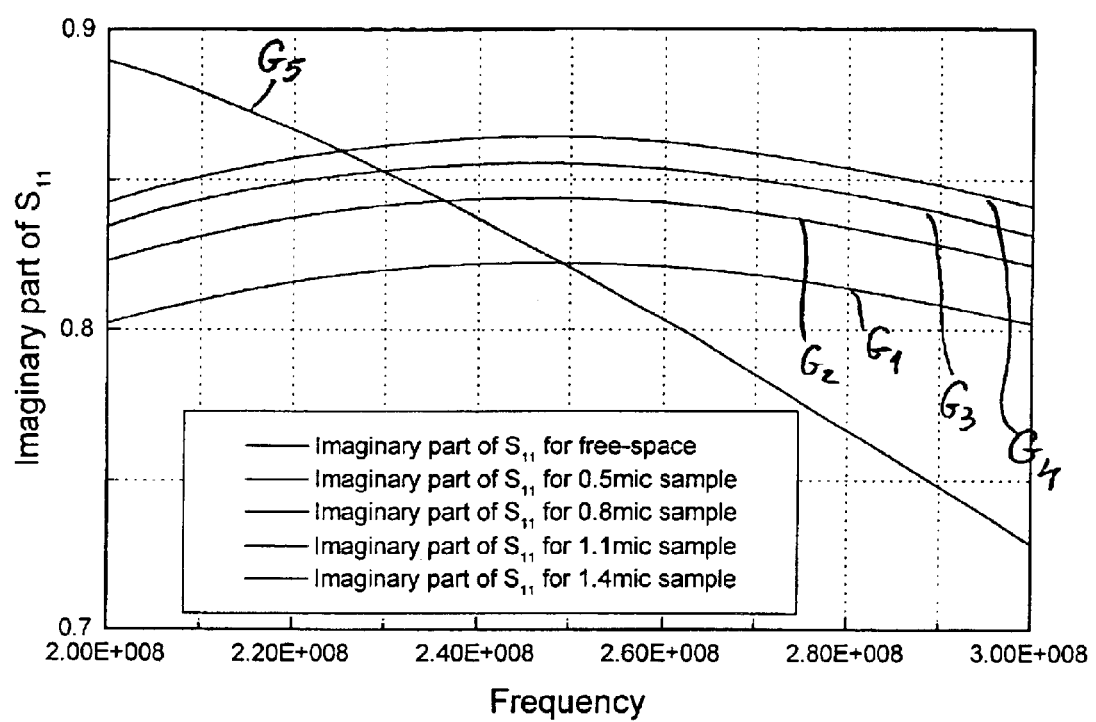
FIG. 9B illustrates graphs corresponding to the results of the fit procedure of FIG. 9A completed for a set of measurements, wherein four graphs present $R_{eddy}$ and $L_{eddy}$ as functions of the layer thickness (d) for different heights (h)

FIG. 9B illustrates graph corresponding to the results of the fit completed for a set of measurements where L is in nanoHenry and R is in Ohms, wherein four graphs present $R_{eddy}$ and $L_{eddy}$ as functions of the layer thickness (d) for different heights (h). For this set of measurements for example, the model that best fits the experimental results (shown in circles and crosses) is given by the following parameters:

$r_1=0.2089$ mm, $r_2=0.2092$ mm, $r_3=0.2399$ mm, $r_4=0.2985$ mm $r_5=0.3459$ mm, $r_6=0.3890$ mm, $r_7=0.4556$ mm $f=268.75$ MHz $\sigma=58.39 \cdot 10^6$ $1/\Omega m$, $\Delta h=5$ $\mu$m These parameters well agree with the actual coil size and actual sample conductivity.

Figure 9C:
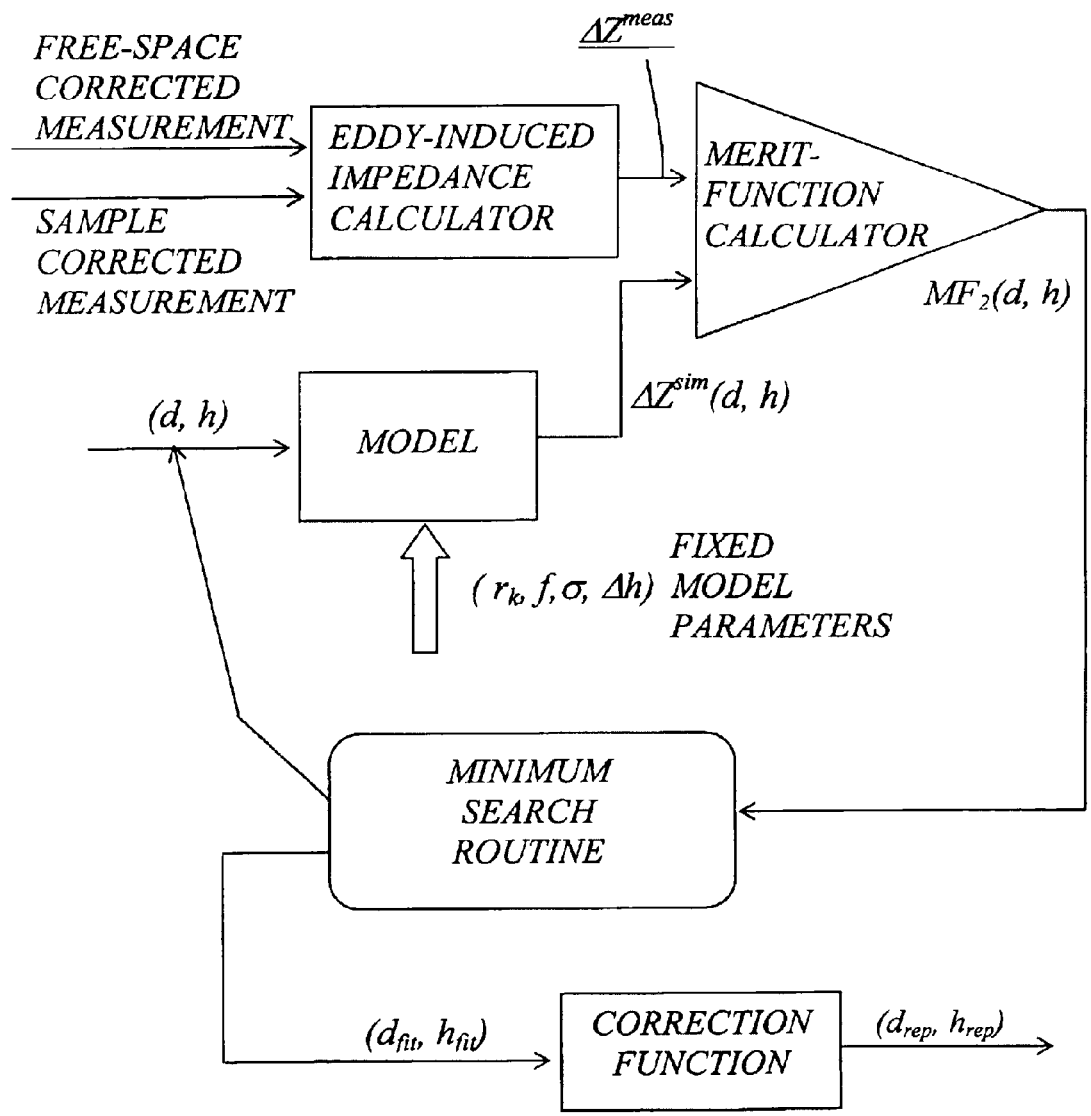
FIG. 9C exemplifies the principles of the normal operation stage (online) according to the method of the present invention.

Normal operation (FIG. 9C) consists of the following: During the normal operation, the free-space measurement is carried out to determine the working temperature (environment condition) using the results of calibration and the correction described above. The free-space and with-sample measurements are processed to find the eddy current induced impedance. The result is then compared to simulated impedance (with the model parameters that were found in the calibration stage) with some guessed sample thickness d and guesses sample-probe distance h. The difference between the simulated eddy current induced impedance and the measured one is evaluated according to the merit-function defined by:

$$MF_2(d,h) = |\Delta Z^{meas} - \Delta Z^{sim}(d,h)|^2$$

and a minimum search algorithm is used to find the (d, h) pair that minimizes this merit-function. These are the d and h values corresponding to this measurement. Alternatively, these results may be further corrected by a simple correction function to reduce accuracy error when compared to a reference tool.

Another possible method for the fit to model off-line procedure utilizes a model optimization for a multi-frequency approach. It should be understood that the other off-line procedures may be the same as described above.

Figure 9D:
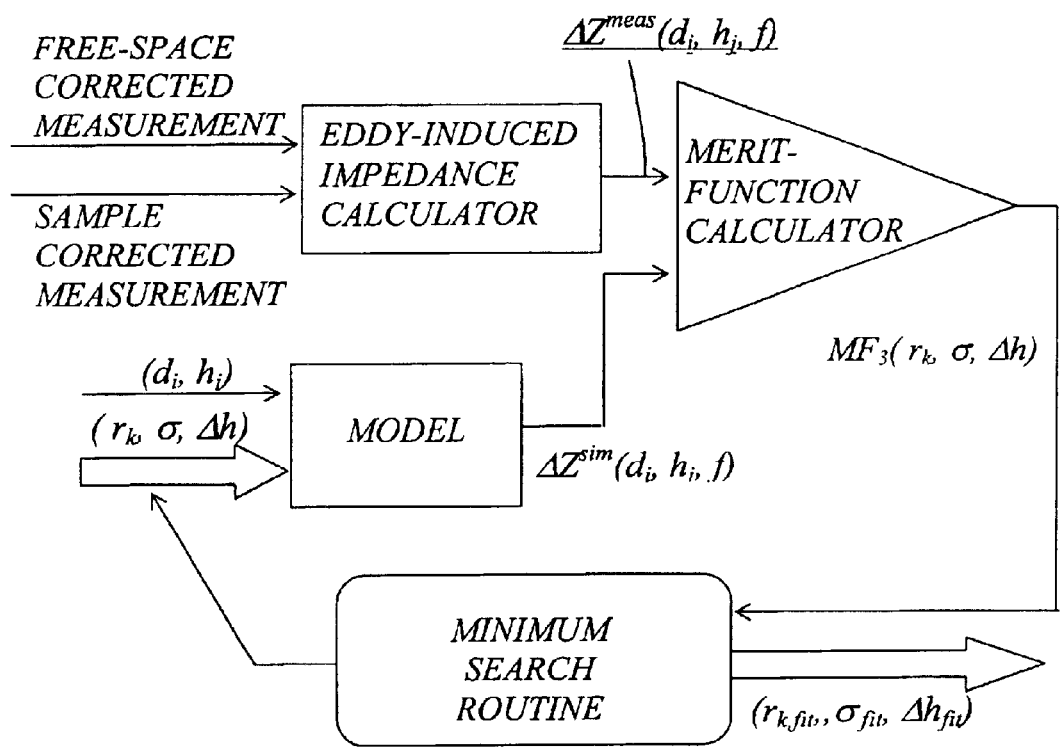
FIG. 9D schematically illustrates the principles of a fit to model off-line stage according to another example of the invention.

FIG. 9D illustrates the principles of this embodiment. This process is aimed at finding the model parameters (without frequency) that best fit the measured results. Here, the eddy current induced resistance $\Delta R_{eddy}(f)$ and inductance $\Delta L_{eddy}(f)$ (or alternatively, the eddy current induced impedance $\Delta Z(f)$) are evaluated for each sample thickness $d_i$ and sample-probe height $h_j$ as functions of frequency. These results are then processed by a suitable algorithm which minimizes the difference between the measured impedance $\Delta Z(f)$ and a simulated impedance $\Delta Z^{sim}(d_i,h_j,r_k,\sigma,\Delta h,f)$. In this case, the frequency f is scanned over the frequency range of the measurements so that $\Delta Z^{sim}$ depends on frequency, while frequency is not a parameter to be fitted. $\Delta Z^{sim}$ depends also on d and h and also on the model that is used for simulation. The model is appropriately designed taking into account the dependency on coil loop radii $r_k$, frequency f, sample conductivity $\sigma$ and sample-probe offset $\Delta h$ which may occur between the measured height-probe distance and the actual distance.

The merit-function in this case is defined as $$MF_3(r_k, \sigma, \Delta h) = \frac{1}{N_f}\sum_f \sum_j \sum_l |\Delta Z^{meas}(d_i, h_j, f) - \Delta Z^{sim}(d_i, h_j; r_k, f, \sigma, \Delta h)|^2$$

wherein $N_f$ is the number of frequencies in the measurement, and a minimum search algorithm is used to find the best model parameters.

In this embodiment, during the normal operation, the free-space and with-sample measurements are processed to find the eddy current induced frequency-dependent impedance. The result is compared to a simulated value of the frequency-dependent impedance (with the model parameters that were found during calibration phase) with some guessed sample thickness d and guesses sample-probe distance h. The difference between the simulated eddy current induced impedance and the measured one is evaluated according to the merit-function defined by:

$$MF_4(d,h) = \frac{1}{N_f}\sum_f |\Delta Z^{meas}(f) - \Delta Z^{sim}(d,h,f)|^2$$

and a minimum search algorithm is used to find the (d,h) pair that minimizes this merit-function. These are the d and h values corresponding to this measurement. Alternatively, these results may be further corrected by a simple correction function to reduce accuracy error when compared to a reference tool.

This approach may be very time consuming during online interpretation because of the requirement to evaluate the simulated impedance for several frequencies, sample thickness and height values. An alternative approach includes preparing an offline library containing impedance spectra for prespecified sets of (d, h) pairs on during normal operation, to retrieve the impedance spectrum from this library.

One possible alternative to the fit to model off-line stage consist of the use of a look-up table. In this method, a two dimensional table of $\Delta R_{Eddy}$ and $\Delta L_{Eddy}$ values as a function of the layer thickness ($d_i$) and height ($h_j$) are built. This table is built off-line by taking measurements at known values of the thickness and height and recording the $\Delta R_{Eddy}$ and $\Delta L_{Eddy}$ of each measurement. During the normal system operation, the thickness is obtained by interpolation between the measured $\Delta R_{Eddy}$ and $\Delta L_{Eddy}$ within the look-up table. This method also allows for obtaining the height of the sensor above the sample.

Another possible alternative to the fit to model stage is the so-called "L over R" method. This method utilizes observation of the theoretical relation between the thickness and the $\Delta R_{Eddy}$ and $\Delta L_{Eddy}$. From this theoretical relation, the sample thickness is proportional to the ratio $\Delta R_{Eddy}/\Delta L_{Eddy}$:

$$\frac{\Delta L_{Eddy}}{\Delta R_{Eddy}} \approx \alpha \cdot d \cdot K(r, h)$$

wherein $\alpha$ is a constant determined by calibration. For a small thickness, K is weakly dependent on height (h), and is thus negligible. For a large thickness, K is dependent an $\Delta L_{Eddy}$ since it depends on the height only.

Figure 10A:
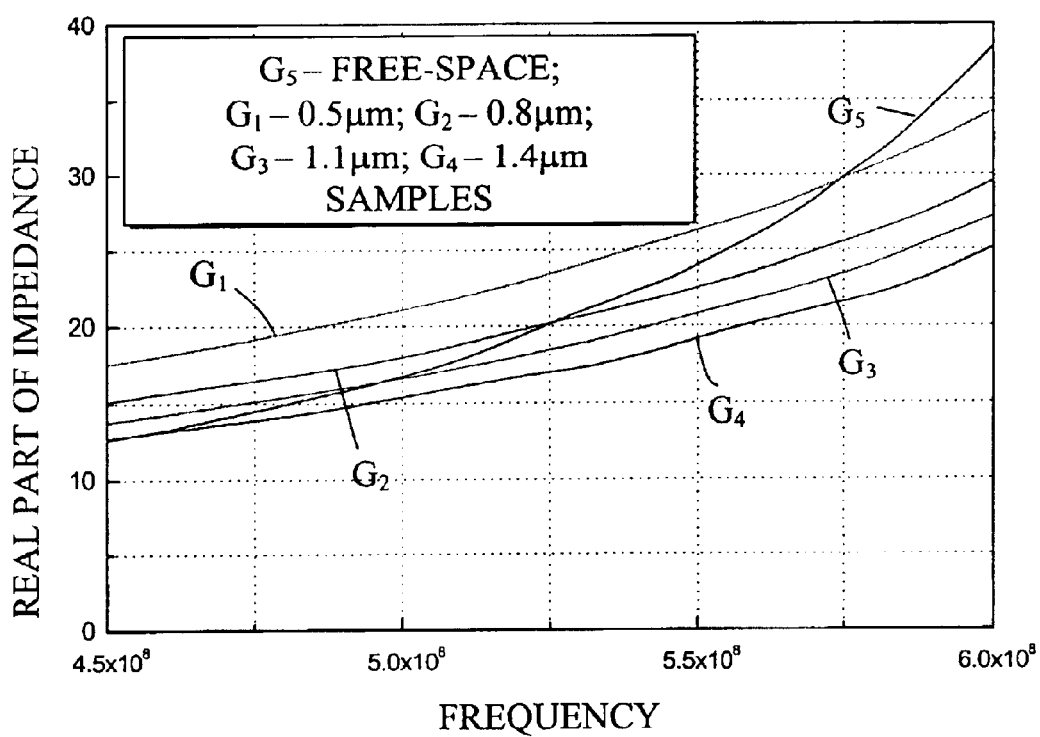
FIGS. 10A and 10B illustrate the look-up table utilizing, respectively, the real and imaginary parts of the impedance.
Figure 10B:
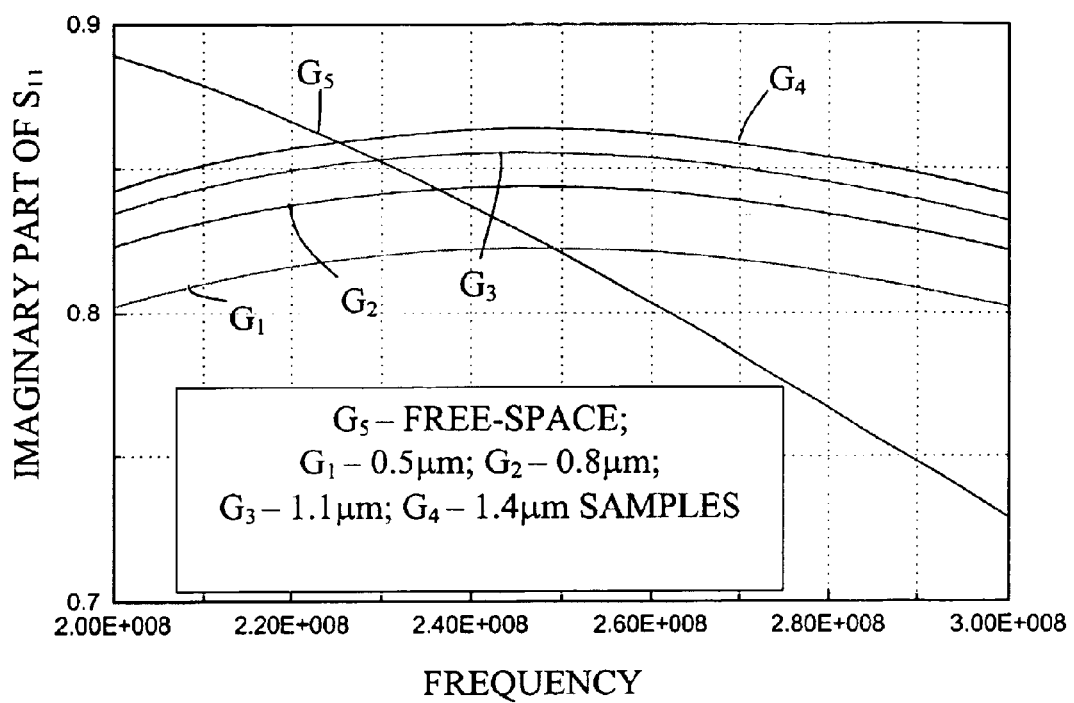

FIGS. 10A and 10B illustrate the one-dimensional part of the look-up table considering, respectively, the real and imaginary parts of the impedance. In each of these figures, graphs $G_1$–$G_4$ correspond to measurements with samples of, respectively, 0.5 µm-, 0.8 µm-, 1.1 µm- and 1.4 µm-thickness silver layer, spaced from the coil at a distance of 60 µm, and graph $G_5$ corresponds to a free space measurement.

Figure 11:
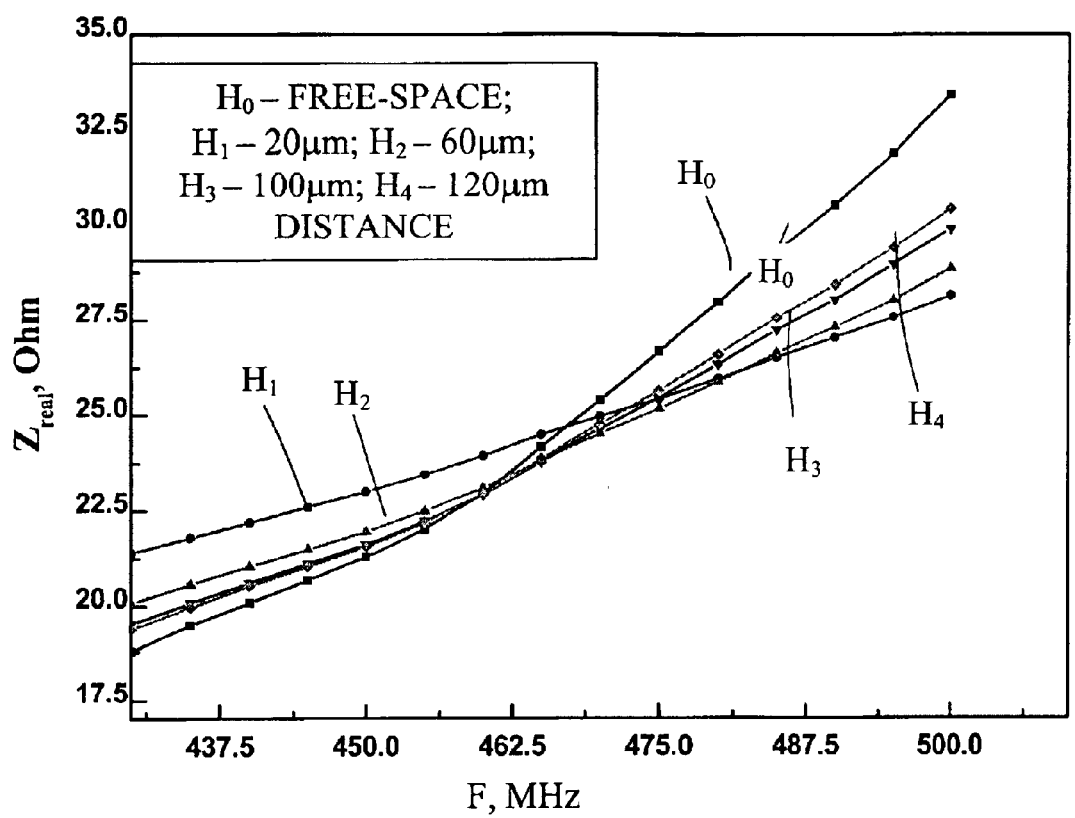
FIG. 11 exemplifies measured data obtained for a free-space coil and for coil with a 0.5 μm-thickness sample at different distances from the coil.

FIG. 11 exemplifies the measured data obtained for a free-space coil (graph $H_0$) and with a 0.5 µm-thickness sample at different distances from the coil: graph $H_1$–h=20 µm, $H_2$–h=60 µm, $H_3$–h=100 µm, and $H_4$–h=120 µm. As shown, for a given sample thickness, there exists a certain frequency (crossing frequency) at which all the graphs different distances) cross graph $H_0$. Measurements with this crossing frequency are independent on the distance between the sensor coil and sample.

Turning back to FIG. 8B, the following example is considered: R=7.5Ω, L=48 nH, C=1.2 pF and X=open circuit. For thin layers of silver on a glass in the thickness range of 0.3–1.1 µm, the crossing is obtained in the frequency range of 380 MHz to 525 MHz. The resonant frequency peak of Re(Z) is at 650 MHz (or higher). As can be seen in FIG. 10A, the spacing of the crossing versus frequency varies such that the crossing for thinner layer is at higher frequencies. For specific layer thickness (0.5 µm), the variations with height (distance h) can be seen from FIG. 11.

The variation in crossing frequency vs. height is much smaller than the variation caused by sample thickness change. This enables a measurement of the layer thickness using such a selected frequency, at which the measurement is substantially un-affected by the height variations.

In the multi-frequency mode, the reflectance\impedance at the coil's port is measured at several frequencies. Similarly, there are several variants of interpretation, as follows:

If the distance h is known, the impedance of the coil is measured near the sample and is compared to the measurement without the sample (or to a measurement with a sample having very thick metal) taken at the same height. Both the theory and experiment show that the real part of the impedance of both measurements cross at a certain frequency, which uniquely (up to noise effects) determines the thickness of the sample. The crossing frequency changes as the distance h is changed, and, if the distance is tightly controlled, the ambiguity in the thickness determination is removed. The translation of the crossing frequency to the thickness is performed by comparing the crossing frequency to a previously prepared look-up table of crossing frequencies for different thicknesses at the certain distance.

If the distance h is unknown, the 'sample-present' and 'no-sample' (or thick sample) measurements can be first fit to an RLC circuit as explained above, and then the crossing frequency only is found in terms of this model. The so-found crossing frequency is again compared to a look-up table previously prepared similarly with a set of known sample thicknesses. This method should be less susceptive to measurements noise as the introduction of a model with small number of parameters reduces the effect of noise.

Another possibility is to fit the whole data (real and imaginary parts of impedance as a function of frequency) to the model and to look for the distance h and thickness d that best fit the data. This approach does not require the preparation of a look-up table, but requires an exact model, which takes into account the coil's exact shape and its interaction with the sample.

The inventors have found that the real part of the sample impedance Z (which is related to the measurable complex reflectance $S_{11}$ according to $S_{11}=(Z-Z_0)/(Z+Z_0)$ where $Z_0$ is a characteristic impedance of the transmission line and is typically 50Ω) acquires an equal value of the free-space impedance at a certain frequency. When the real part of the impedance of the sample and free-space are plotted against frequency, this certain frequency is marked by the crossing of these two curves. This crossing frequency is uniquely related to the thickness of the sample. By a simple look-up table relating this frequency to a known set of thicknesses, the crossing frequency may be used as a measure of the sample thickness. It appears that this crossing frequency is much less susceptible to sample-probe distance than any other frequency.

The following are some aspects that can be taken into consideration for the technique of the present invention.

The total time allowed for data collection from a specific site on the sample is limited by the required throughput of the measurement system. For the multiple-frequency mode of operation, the total time allowed, $T_t$, consists of an actual measurement time plus frequency shift time:

$$T_t = mT_1 + (m-1)T_s$$

wherein m is the number of frequencies, $T_m$ is the measurement time at each frequency, and $T_s$ is the time required to shift between the frequencies.

For equi-spaced frequencies covering the range from $F_{min}$ to $F_{max}$, with standard deviation of $S_{11}$ measured at each frequency error $n_{s11}$, a crossing frequency error $\sigma_F$ is obtained. This error is reduced with increasing on the number of frequencies sampled. From Monte Carlo simulations, the dependency is found to be:

$$\sigma_F = \alpha \frac{n_{s11}}{\sqrt{N_f}}$$

wherein $N_f$ is the number of frequencies and $\alpha$ is a proportional constant with unit of Hz.

The noise of each measurement is due to a constant part plus a measurement time dependent part:

$$n_{s11} = n_0 + \frac{\beta}{\sqrt{T_m}}$$

where $n_0$ is the constant noise part and $\beta$ is a proportional constant.

The number of samples is:

$$N_l = \frac{T_l + T_s}{T_m + T_s}$$

For short shift time relative to $T_t$ we have:

$$N_l = \frac{T_l}{T_m + T_s}$$

The crossing frequency error is then:

$$\sigma_F = \alpha \frac{n_n + \beta l \sqrt{T_n}}{\sqrt{(T_l/T_s + T_m)}}$$

For small constant noise:

$$\sigma_F = \alpha\beta\sqrt{\frac{T_s + T_m}{T_m T_t}}$$

which for negligible shift time gives the expected relation:

$$\sigma_F \sim \frac{\alpha\beta}{\sqrt{T_t}}$$

The full crossing frequency error optimized using $T_m$ gives:

$$\frac{d}{dT_m}\sigma_F = \frac{d}{dT_m}\left[\alpha\frac{n_a + \beta/\sqrt{T_m}}{\sqrt{T_t + T_s/T_m + T_s}}\right] =$$

$$= \alpha\frac{-\frac{1}{2}\beta(T_m)^{-3/2}\left(\frac{T_t + T_s}{T_m + T_s}\right)^{1/2} - (n_a + \beta/\sqrt{T_a})\left(-\frac{(T_t + T_s)}{(T_m + T_s)^2}\right)\left(\frac{T_t + T_s}{T_m + T_s}\right)^{-1/2}}{\frac{T_t + T_s}{T_m + T_s}}$$

Equating to zero for minimum or maximum gives $\sigma_F$ the relation:

$$\frac{1}{2}\beta(T_m)^{-3/2}\left(\frac{T_t + T_s}{T_m + T_s}\right)^{3/2} = \left(n_o + \frac{\beta}{\sqrt{T_m}}\right)\frac{(T_t + T_s)}{(T_m + T_s)^2}\frac{1}{2}\left(\frac{T_t + T_s}{T_m + T_s}\right)^{-3/2}$$

$$= \left(\frac{n_o}{\beta} + \frac{1}{\sqrt{T_m}}\right)$$

$$= T_m^{-3/2}\frac{(T_t + T_s)^{1/2 + 1/2 \times 1}}{(T_m + T_s)^{1/2 + 1/2 - 2}} = T_m^{-3/2}(T_m + T_s)$$

$$\frac{n_o}{\beta} = T_m^{-3/2}(T_m + T_s) - T_m^{-1/2} = \frac{T_s}{T_m}\frac{1}{T_m^{1/2}} \quad \text{or} \quad T_m = \left(\frac{\beta T_s}{n_0}\right)^{2/3}$$

Inserting for $T_m$ in equation $$\sigma_F = \alpha\frac{n_o + \beta/\sqrt{T_m}}{\sqrt{(T_t/T_s + T_m)}}$$

gives the following:

$$\sigma_F = \alpha n_o + \beta\left(\frac{\beta T_s}{n_o}\right)^{-1/3}\left[\frac{T_s + \left(\frac{\beta T_s}{n_o}\right)^{2/3}}{T_t}\right]^{-1/2}$$

The crossing frequency error can be further minimized by performing real-time optimization at the samples frequency values in one of the following ways:

(1) Two measurements are taken at the limits of the frequency range $F_{min}$–$F_{max}$, and Re(Z) of the two states is found. The crossing region is interpolated and a series of measurements with much smaller spacing is performed. The RLC parameters are then calculated by optimization with larger weighting to the measurements near the crossing frequency.

(2) Three measurements are taken at the lower, median and upper frequencies. An initial RLC set is optimized, and an initial estimate of the crossing frequency is made ($fc_0$). Further three measurements are made, centered at the estimate frequency, with a smaller frequency separation. For example, the separation could be $\Delta t_1$=15 MHz (as opposed to $\Delta t_0$=150 MHz initially).

After additional optimization, with enhanced weighting of the second trio at measurements, an improved crossing estimate, $fc_1$ can be found. The above steps can be repeated with sequentially smaller $\Delta t_1$ until $fc_1$ can be found at the required accuracy.

This mode of operation is dependent on the ability to perform fast, real-time optimization calculations, as well as fast bi-directional frequency shifts. For example: in four stages, the resolution of 150 MHz→15 MHz→1.5 MHz→150 KHz can be achieved.

This gives the total of 12 measurements. For maximal accuracy, the first 9 measurements can be with a wide bandwidth and the last 3—with a narrow bandwidth.

For utilizing $T_t$, the time can be divided such that the first three stages are $(T_s+T_{m1})\times3+T_{cdc}\times1\approx(1 \text{ msec}+5 \text{ msec})\times3+80 \text{ msec}\approx100$ msec for a total of 0.3 seconds.

The fourth stage is only $(T_{s1}+T_{m2})\times3\approx(1 \text{ msec}+30 \text{ msec})\times3\approx100$ msec, since the calculation is carried out concurrently with the stage movement to the next site.

The following is the example of the application of the technique of the present invention for metal thickness measurement within the patterned areas (i.e., areas having surface topology due to the pattern in underneath layers). Examples of such patterned areas due to electroplating (cross section) are illustrated in FIGS. 12A–12D. Zones above the edges of a step-like structure (strip) are characterized by increased resistance because the metal layer become thinner, and zones above the trenches (FIG. 12B) are characterized by decreased resistance due to thickening of the metal layer thereabove. The local planarization length is usually in the range of about one micron.

Figure 12A:
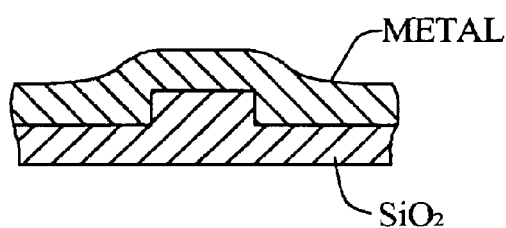
Figure 12B:
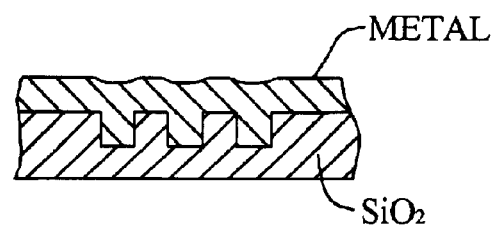

In the example of FIG. 12A, the effective resistance depends on the number of steps within the diameter of the coil. For feature size significantly larger than 1 micron, the resistance of areas, where the current is perpendicular to the stripes, can be remodeled by resistors connected in series, where the step zones have increased resistance.

For areas where the current is parallel to the stripes, the two zones of resistance are added in parallel.

$$R_\| = \left(\frac{1}{\frac{D}{\rho_1 L} + \frac{d}{\rho_2 L}}\right)M$$

where $\rho_1$ is surface resistivity of thick areas, $\rho_2$ is that of thin areas, M is the number of thin strips within the width W, and $\rho_2 > \rho_1$, $R_\|$ is the resistance of an area of length L and width W. (FIG. 12C).

Figure 12C:
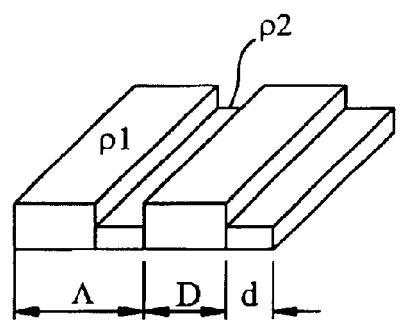
Figure 12D:
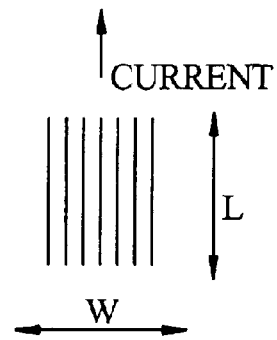

For perpendicular case (FIG. 12D), the structure is similar to that of FIG. 12C, only with current flowing perpendicularly to the strips and L and W interchanges. In this case, we have:

$$R_j = \left(\rho_1\frac{D}{W} + \rho_2 + \frac{d}{W}\right)N$$

where N is the number of strips within the length L.

Inserting for D using the relation: D+d=L/N, we have:

$$R_\perp =$$

$$\rho_1\frac{N}{W}\left(\frac{L}{N} - d + \frac{\rho_2}{\rho_1}d\right) = \rho_1\frac{L}{W} + (\rho_2 - \rho_1)\frac{Nd}{W} = \rho_1\frac{L}{W}\left[1 + \frac{Nd}{L}\frac{\rho_2 - \rho_1}{\rho_1}\right]$$

Inserting D+d=W/M for $R_\parallel$, we have:

$$R_\parallel = \rho_1 \frac{L}{M} \frac{1}{\frac{W}{M} - d + \frac{\rho_1}{\rho_2}d} = \rho_1 \frac{L}{W} \frac{1}{1 - \frac{Md}{W}\frac{\rho_2 - \rho_1}{\rho_2}}$$

Inserting the pitch $$\Lambda = 2\frac{W}{M} = 2\frac{L}{N} \qquad \text{Equ. 1}$$

we have:

$$R_\perp = \rho_2 \frac{L}{W}\left[1 + 2\frac{d}{\Lambda}\frac{\rho_2 - \rho_1}{\rho_1}\right] \quad R_\parallel = \rho_2 \frac{L}{W}\left[\frac{1}{1 - 2\frac{d}{\Lambda}\frac{\rho_2 - \rho_1}{\rho_2}}\right] \qquad \text{Equ. 2}$$

For large pitch regime, equation (1) can approximate $R_\parallel$:

$$R_\parallel \cong \rho_1 \frac{L}{W}\left[1 + 2\frac{d}{\Lambda}\frac{\rho_2 - \rho_1}{f_2}\right] \quad d \ll \Lambda$$

The total resistance of a square coil eddy current is as follows:

$$R_T = 2R_\parallel + 2R_\perp \cong 4\rho_1 \frac{L}{W}\left[1 + \frac{d}{\Lambda}\left(\frac{\rho_2}{\rho_1} - \frac{\rho_1}{\rho_2}\right)\right]$$

This is true for the near-field case, where the coil is very close to the sample. In the small pitch regime, the resistance is obtained from $R_\parallel$ and $R_J$, in equations 1 and 2. The high resistivity zone of length d, two such zones occurring in every pitch $\Lambda$, becomes one low resistivity zone over the etched areas. In that case, we have:

$$R_\perp = \frac{\rho_1 L}{W}\left[1 + \frac{a}{\Lambda}\frac{\rho_2 - \rho_1}{\rho_1}\right] = \rho_1 \frac{L}{W}\left[1 - \frac{a}{\Lambda}\frac{\rho_2 - \rho_2}{\rho_1}\right]$$

$$\rho_1 > \rho_2$$

$$R_\parallel = \rho_1 \frac{L}{W}\frac{1}{1 - \frac{a}{\Lambda}\frac{\rho_2 - \rho_1}{\rho_2}} = \rho_1 \frac{L}{W}\frac{1}{1 + \frac{a}{\Lambda}\frac{\rho_1 - \rho_2}{\rho_2}}$$

For circular coils, the local resistivity is a function of the angle of the current flow in relation to the pattern.

In general, we have:

$$R(\theta) \cong \rho_1 \frac{L}{W}\frac{1 + 2\frac{d\sin\theta}{\Lambda}\frac{\rho_2 - \rho_1}{\rho_1}}{1 - 2\frac{d\cos\theta}{\Lambda}\frac{\rho_2 - \rho_1}{\rho_2}}$$

where $\theta$ is the angle between the current vector and the strip direction.

For an isolated line of conductor having the length l and width d, we have:

$$R_\perp = \rho_1 \frac{L}{W} - \rho_1 \frac{d}{l} + \rho_2 \frac{d}{l}$$

$$R_\parallel = \frac{1}{\left(\rho_1 \frac{L}{W}\right)^{-1} - \left(\rho_1 \frac{l}{d}\right)^{-1} + \left(\rho_2 \frac{l}{d}\right)} \cong \cong$$

$$\rho_1 \frac{L}{W} + \left(\rho_1 \frac{L}{W}\right)^2\left[\left(\rho_2 \frac{l}{d}\right)^{-1} - \left(\rho_1 \frac{l}{d}\right)^{-1}\right] = \rho_1 \frac{L}{W} + \left(\rho_1 \frac{L}{W}\right)^2\left(\frac{\rho_1 \rho_2}{\rho_1 \rho_2}\frac{l}{d}\right)^{-1}$$

In the single frequency operational mode, a monochromatic RF signal is injected into the coil, and a reflected complex signal R at the coil's output port is recorded. This reflection can be translated to the coil impedance as follows:

$$Z = Z_0 \frac{1 + S_{11}}{1 - S_{11}}$$

wherein $Z_0$ is the characteristic impedance of the transmission line connecting the RF source to the coil. This mode has two variants depending on whether the coil-sample distance h is known or not. If this distance h is known, the resistance of the coil at the presence of the sample is extracted and compared to a look-up table (of resistances) which was prepared previously for the same distance h and for various known sample thicknesses $d_1, d_2, \ldots d_n$. The thickness d of the current sample may be extracted by interpolating the values in the look-up table. If the distance h is unknown, a two-dimensional look-up table is prepared for several known sample thicknesses and several known sample-coil distances $h_1, h_2, \ldots h_m$ which contain the complex reflectance (or impedance). The measurement is then compared to the value in the look-up table, and both the sample thickness d and the coil-sample distance h are extracted using the two-dimensional interpolation scheme.

The inventors have found that the imaginary part of the complex reflectance $S_{11}$ measured with the sample acquires an equal value as the corresponding value measured for the free-space at a certain frequency. When these imaginary parts of the sample and free-space are plotted against the frequency, the frequency is marked by the crossing of these two curves. Again, this crossing frequency is uniquely related to the thickness of the sample. By a simple look-up table relating this frequency to the known set of thicknesses, the crossing frequency may be used as a measure of the sample thickness. Another possibility is to record not the crossing frequency, but the value of the imaginary part of $S_{11}$ of the curves at the crossing frequency. The experiments have shown that this value is less susceptive to thermal effects.

The advantage of this method over the previous one is that the analysis is done on the measured data directly without involvement of the parameters (such as $Z_0$) whose values may not be known to a good precision.

Thus, the main steps in one preferred embodiment of the invented method (independent on the distance between the sample and coil) are as follows:

System calibration is carried out, which requires several (one or more) calibration standards:

(a) The simplest and useful standard that also can serve as external conditions indicator/sensor is free space standard—ECS measurement in the free space (free space response of the coil), that is, at a distance more than 6–10 mm from any conductive surface. This measurement will be used as a reference for any other measurements—in both, single frequency and multi-frequency (sweep) mode. By special algorithm this measurement also cart indicate change in external conditions—temperature (the most important), humidity, etc. These conditions affect the measurement result by causing unwanted drifts, shifts, etc. thus reducing system accuracy. By measuring this free space value (and maybe for some other calibration standard) and comparison with nominal curve it is possible to extract additional information about external conditions and thus to correct possible errors in the measurement values.

(b) Specially prepared sample of a known thickness is prepared and located at fixed known distance from the sample. It can be placed for example near the wafer on the sample holder. It maybe single known thickness sample or several (2–5) standards with several thicknesses covering the measuring range. In particular case, it maybe for example some bulk sample from the same material as the measuring sample and with thickness that ensures the effective thickness equivalent to the bulk material—that means at least 10 times of skin-depth at the lowers measuring frequency—in practice, about 1–2 mm will be enough. In order to ensure fixed sensor-to-sample separation, the calibration standards maybe covered with some kind of dielectric non-magnetic film (for example, some plastic film suitable for high-frequency use that is not polarized at high-frequency electric field) with known and stable thickness. By soft touching this standard with ECS placed on some elastic mount, it is possible to perform a calibration procedure with known standard at known distance. On a wafer, the measurements are performed without such touch—in close proximity mode in order to ensure reliable work without any damage to wafer. This step is repeated for samples with various thicknesses. The samples can be pre-measured on a traceable tool such as four-point probe (4PP) sheet resistance measurement system. The samples are preferably chosen so that they cover the required thickness range at intervals such as 0.1 micron.

Then, all the samples measured are compared to the free space measurement and the crossing frequencies are recorded. A look-up table of relative measurements is thus built, or equations of relation between free-space and sample measurements are prepared. The frequency response of the various calibration samples is retained, and a fitting procedure is carried out to obtain the RLC parameters related to each sample.

Measurements are now applied to an unknown sample (DUT). Free space frequency response is measured as calibration. The unknown sample is measured at a predetermined distance from the coil. A thickness value is determined by inserting relation to the free-space measurement in equation or by interpolation of table values. The measured signal $S_M$ is transformed into impedance Z. The RLC parameters are fitted by one of various optimization procedures to the Z(f) frequency response. The RLC parameters are used for calculating the crossing of the Re(Z) measured on the sample with the free space curve.

The robustness, accuracy and repeatability of the crossing calculation are greatly improved by calculating the RLC parameters, in relation to non-model based interpolations, such as spline or cubic spline. The crossing frequency vs. sample resistance (or thickness) relationship is modeled analytically. This can be based on a physical model or a regression relation of a polynomial or other type of equation. The crossing frequency measured on an unknown sample is inserted into the crossing frequency vs. resistivity equation and the resistance (a thickness if sample resistivity is known) is obtained.

The height (distance between the coil and sample) is chosen so that the variation on RLC parameters is maximized, i.e., maximal eddy current. This requires a minimal distance from the sample source. On the other hand, the effect of height errors, which are not dependent on the absolute distance, is larger for smaller heights. For example, for height error of 1 $\mu$m, the effect at a 20 $\mu$m-height is much larger than that at a 50 $\mu$m-height.

The technique of the present invention is highly sensitive to defects in the sample, such as edge effects, holes/protrusions. To inspect the sample for defects, the sensor coil scans the sample, at least within a predetermined region of a predicted defect. Location of such region can be done by scanning the sample with a large eddy current coil, or by using optical methods (e.g., based polarization effects, image processing, fluorescence, etc.). The image processing may be based on the dark field imaging. In other words, the technique may utilize a combination of optical and electrical effects. For thickness/conductivity measurements, the coil is preferably oriented with respect to the sample such that the coil plane is parallel to the sample plane. For the inspection technique, the coil plane can be oriented perpendicular to the sample.

The present invention advantageously provides for measuring the thickness of a deposited layer on a sample, and utilizing this information to control a semiconductor manufacturing process. Utilizing the system of the present invention as an integrated metrology system within an electroplating tools arrangement enables to provide the process control information for a number of different steps of the process. The electroplating process tool typically contains a module within which wafers undergo an annealing process that essentially changes the resistivity of the conductive layer. This process can be controlled by measuring the wafers prior to and after the annealing process. As that the technique of the present invention provides information of the sample resistance, and keeping in mind that the thickness of the sample in the two measurements is essentially unchanged, the difference between the two measured resistance values is a measure of the process induced resistivity change.

Figure 13:
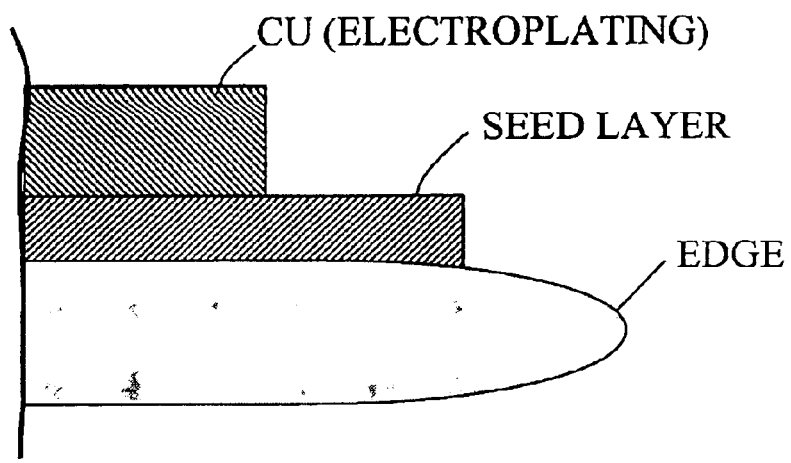
FIG. 13 illustrates the formation of a step-like structure on the wafer surface, as a result of a process of removal of the seed layer from the back-side and the wafer edge, after the electroplating process.

The present invention advantageously provides for measuring the thickness of a deposited layer on a sample substantially up to the edge of the deposited layer. The distance from the edge to which the thickness can be measured is essentially related to the diameter of the coil. Below that distance, the signal becomes a combination of a signal generated by the deposited layer and a signal generated by the substrate exposed beyond the edge of the deposited layer. In the electroplating stage of the Dual Damascene process, the seed layer remains continuous over the front surface of the wafer. Thus, the signal measured at the edge, is a combination of the electroplated layer and the seed layer. In certain cases, after the electroplating process, the wafer undergoes a process of removal of the seed layer from the back-side and the wafer edge, usually by chemical means. The result is the formation of a step-like structure (at least one step) on the wafer surface when considering the surface profile from the center towards the wafer's edge, as shown in FIG. 13. The present invention can be utilized to measure both the thickness and radial location of the steps on the wafer surface, thus essentially generating a two dimensional profile.

The measurement can be performed either by point-to-point motion of the sample in relation to the coil, with stabilization at a known coordinate, or by performing continuous scanning of motion, whereby the time to complete a measurement is of the order of the time required to move the sample a distance proportional to the diameter of the coil. To generate information of the profile, a series of point measurements can be made, spaced apart in a direction perpendicular to the wafer edge, each measurement providing information on the layer thickness at that location. A profile can be generated based on these measurements. To enhance the definition of the radial location of a particular step, measured information can be utilized for transformation to produce a signal, not necessarily proportional to thickness, in which the contrast at each step is maximized. This enables enhanced accuracy in providing the radial location of each step. Based on an initial measurement of the sample response on a continuous deposited area separate from the edge, a frequency can be chosen whereby the frequency is that of the crossing effect of the site, either in Imaginary $S_{11}$ or in Real Impedance. The definition of the radial location of the edge can be achieved with accuracy better than the spot-size of the measurement by utilizing curve-fitting algorithms. These algorithms can be used on any of the possible signals that are described above. Sub-pixel resolution can be achieved in the order of a tenth of the spot-size or better The system can be operated in an essentially analog measurement mode, whereby the operating frequency is that of a crossing frequency. The sample is scanned under the coil, and a continuous analog signal is generated. For essentially constant thickness, the signal is essentially constant until an edge is encountered. A large fluctuation is observed near the edge and beyond it above the seed layer until the coil encounters the relatively low-conductivity substrate or past it where the signal is the free-space signal, which is equal to the initial signal obtained at the start of the scan above the continuous deposited area. The analog signal can be analyzed and the location of the steps, i.e. edge of electroplated layer, edge of seed layer, edge of other layers on the wafer surface or edge of wafer, can be defined.

In another embodiment, the system can be operated in an essentially analog measurement mode, whereby the operating frequency is some other predefined frequency. The sample is scanned under the coil, and a continuous analog signal is generated. For essentially constant thickness, the signal is essentially constant until an edge is encountered. The analog $S_{11}$ measurement signal can be analyzed to provide the R and L parameters of the successive measurement points. The location of the steps, i.e. edge of electroplated layer, edge of seed layer, edge of other layers on the wafer surface or edge of wafer, can be defined.

Figure 14:
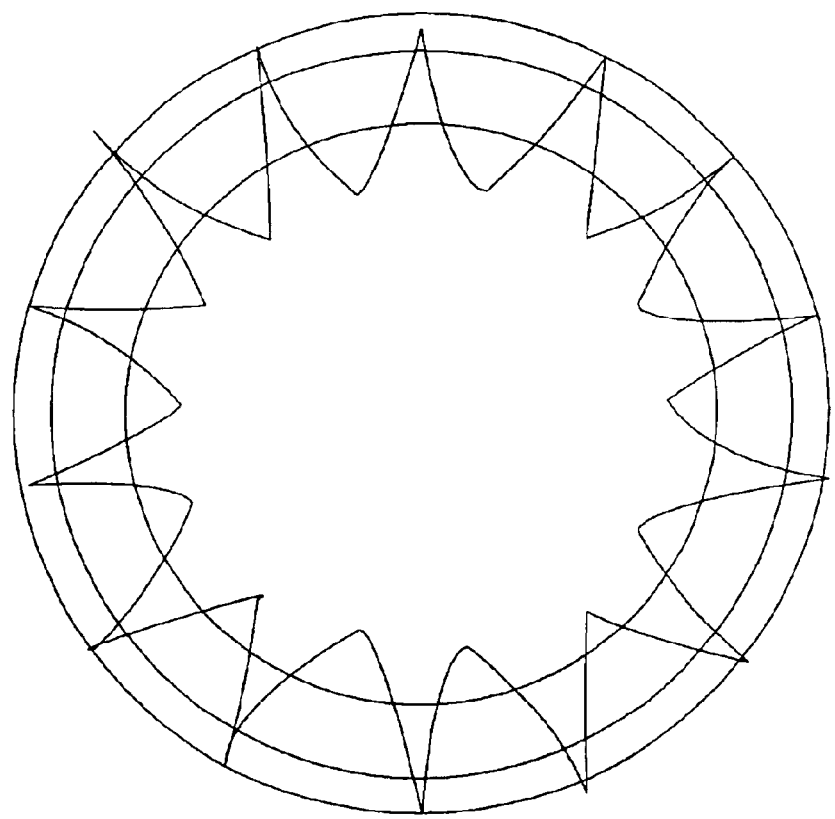
FIG. 14 illustrates the principles of measuring the step locations around the circumference of the wafer by continually scanning the wafer under the coil while rotating the wafer.

A system for measurement of the step locations around the circumference of the wafer can be provided by continually scanning the wafer under the coil while rotating the wafer. To generate the information for the local step location at multiple points around the circumference, a meandering pattern is performed, whereby the wafer is simultaneously rotated and oscillated laterally (FIG. 14). The number of edge crossing points on the circumference is defined by the ratio of lateral oscillation frequency to angular rotation frequency.

The edge location information can be utilized to provide information on the diameter and center offset of both the electroplated area and the seed area that remains after the chemical removal. This information is important for control of the various process steps occurring in the electroplating tool. The edge of the electroplated region is defined by a ring affixed to the wafer during the electroplating. The de-centration of the edge can detect problems with the ring placement. Combining this with the information on the electroplated layer thickness at the edge, allows for detecting the problems with adhesion as well as aging of the ring. The de-centration and diameter of the seed layer edge can point to problems with the chemical system that is used to etch the seed layer off the rim of the front surface of the wafer.

The system can be utilized for measurement of thin conducting layers or thin conducting residues on wafers. Measurements can be performed for detection of variations with-in the wafer, or more specifically for detection of the presence of residues on an otherwise clean wafer. An embodiment of such a method can be by utilizing a specific frequency and scanning the whole wafer underneath the sensor. A two-dimensional map of the real and imaginary response can be generated. This can be utilized for building a two-dimensional map of the thickness on the wafer. This map can be analyzed by image processing techniques to determine areas with variations in the thickness of a top conducting-layer. This can be utilized in an Electroplating system for mapping deposited thickness variations or in a Metal CMP system to map metallic residues or in a PVD system for mapping barrier/seed thickness variations.

The two-dimensional map can be analyzed, and defects can be located. The system can also be operated in a scanning mode based on a crossing frequency mentioned above. Variations in thickness due to pattern will be detested as quantitive measurements enabling generation of a 2-D map of the wafer surface. Large defects of tens of microns area can be recognized as deviations from the repetitive die map pattern.

Subsequently the defective points can be measured one at a time using the full frequency range in order to obtain accurate information on the thickness there.

The present invention enables measurement of the layer thickness over various pattern densities within a single die of a processed wafer. This information can be utilized to provide a measure of the die planarity. More specifically, information on the elevation difference, i.e. step-height, between field-like lightly patterned areas and dense patterned areas, can provide valuable information on the amount of super-filling occurring in the die. This step-height can vary over time between wafers due to changes in the chemical composition of the electroplating bath. Additionally, with-in-wafer step-height variations could occur which are also attributable to variations in the chemical supply to the wafer surface. The capabilities of the present invention to detect variations of this type can enable process control of chemistry of the electroplating process.

The measurement technique enables obtaining information of the top-layer (sometimes known as overburden) thickness with essentially little effect of the underlying pattern. This enables measurement of thickness over patterned trenches without need for prior knowledge of the underlying structure. In the present embodiment, the spot-size is small enough to enable scanning at sufficient resolution to provide a meaningful 2D thickness map of an area of die-like size. The insensitivity to underlying pattern enables forming a 2D map insensitive to the exact placement of the measurement points on the scale of one tenth of the spot-size.

Figure 15:
FIG. 15 illustrates the die topography map.

The following describes a process whereby a two-dimensional scan can be performed, manually or automatically, to produce a 2D thickness map of a die (FIG. 15). This is utilized to create a recipe, manually or automatically, for a metal thickness measurement system. The recipe should contain measurements on in-die locations preferred by the user to enable process control. These within-die locations can be based on various process control requirements such as maximum thickness range in die or measurement on large arrays. The dies can be chosen for measurement based on preset rules defined by the user. The combination of within-die rules and die-map rules can be utilized to generate, manually or automatically, a full-wafer process control recipe.

Initially global alignment of the wafer is performed based on edge and notch detection.

If the information is required, linear scans can be performed in X- and Y-axes, at a predetermined frequency, to measure the die size.

A coarse scan is performed in order to provide a two-dimensional map of a large area. The area for scanning should be chosen to cover to the lithography field or at least one full die. This scan is also used as a basis for choosing the within-die measurement points based on predefined rules.

The accuracy requirements of the coarse scan measurements can be reduced in relation to that required for point-to-point process control measurements. This enables high-speed scanning of the entire area, either by reducing the frequency range, increasing the bandwidth of individual measurements or reducing the height accuracy. The coarse two-dimensional scan can be carried out with steps of size equivalent to the spot-size or close to it. A useful range can be 25% to 200% of the spot-size.

The first step is mapping of the coil height at selected points, preferably the corners, of the area to be scanned. This enables, by interpolation, to perform the scan within the area at relatively accurate height without need for frequent monitoring.

For a coil with 1 mm spot-size, 0.25–1.0 mm step with interpolated height correction can provide a 2D map of sufficient detail to enable correct placement of potential measurement sites for process control. The scan can be with based on point-to-point movement in conjunction with multi-frequency measurement or a continuous-motion single-frequency measurement. The optimization of measurement frequency-mode is based on limitations of time available for the scanning, pattern variability and density and type of process control required. The motion during scanning or between points can be performed in raster pattern or other patterns that provide full area coverage.

If required, due to changes in the ambient environment, periodic system calibration can be performed before the scan, during the scan or afterwards. In the case of an R-Theta stage, to minimize movement, the coarse scan can be performed on dies at the wafer edge; this enables near orthogonality of R and Theta motion during a raster-like scan. The measured data can be displayed as a 2D thickness map. If required, the measurements can be recalibrated based on interpolation of calibration data.

Based on the 2D map, potential measurement sites can be chosen within the die. These can either be chosen manually by a system operator or based on a user's predefined rules as dictated by the user's process control requirements. Data processing algorithms can be implemented to locate these sites, for example thick and thin areas in the field can be located as minima or maxima of the 2D map.

For verification, measurements are subsequently carried out with full capabilities on locations chosen in the previous step from the 2D map. To verify local repeatability in relation to placement accuracy, it is also possible to perform multiple measurements, locally shifted in X and Y, around the sites. It could be beneficial to initially define extra sites to enable subsequent disqualification of problematic sites.

An optical channel can also be used to verify that the sites are regularly patterned on the scale of the spot-size in order to reduce potential sensitivity to small measurement location errors. This can be verified automatically based on image processing algorithms or performed manually be the operator.

Based on die size and the coordinates of the previously determined measurement sites, it is possible to generate a full wafer map of measurement locations. This is based on a user's predefined rules for location of measured dies across the wafer. These rules can include: number of measured dies, radius range of specific points, angular coverage of all wafer areas, minimal spacing between dies and more. For example, the definition can take into account tie ability to utilize the measurements for wafer CMP profile correction using polish-zone.

Figure 16:
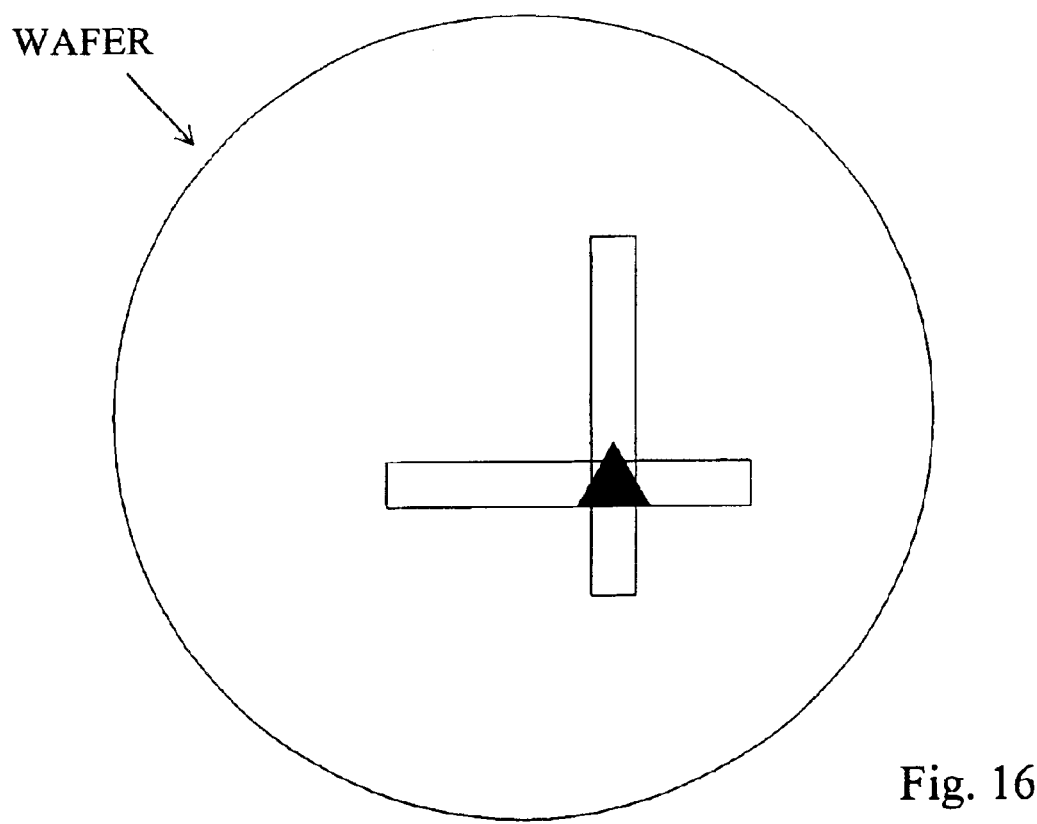
FIG. 16 illustrates the principles of using the technique of the present invention for detecting small defects in a sample, by scanning the sample in two orthogonal directions with an elongated rectangular coil with a large aspect ratio.

To detect small defects, a rectangular coil with a large aspect ratio can be used, in which the lateral width dimension can be in the order of 10 microns. Scanning can be performed in two orthogonal directions, thus forming two separate maps. A defect will be found in each map with very different degrees of certainty for the different orthogonal axes. Combining the information from the two maps can provide high-resolution placement location of the defect as well as enabling separation of defects that combine into one due to the reduced resolution of each of the separate scans (see FIG. 16).

In a certain mode of operation the system can be utilized for various combinations of measurements such as prior to electroplating measurements, after electroplating measurements, after edge bead removal measurements, before, during and after annealing measurements.

The prior to electroplating measurements include measurement of the following parameters: sheet resistance of barrier/seed layer; thickness of barrier/seed layer; thickness and resistivity of barrier/seed layer; resistivity of barrier/seed layer; wafer radial or diameter profile of barrier/seed sheet resistance or thickness; wafer surface mapping of barrier/seed sheet resistance or thickness; wafer radial or diameter profile of barrier/seed non-uniformity; and wafer surface mapping of barrier/seed non-uniformity.

The after electroplating measurements include measuring the following: center point sheet resistance measurement; center point thickness measurement; measuring wafer radial diameter profile of sheet resistance or thickness; measuring wafer diameter profile of pattern step-height; wafer surface mapping of sheet resistance or thickness; wafer surface mapping of pattern step-height; full die surface mapping for within-die uniformity; thickness profile of layers at wafer edge; and scanning of wafer circumference while oscillating, for mapping edges of metallic coatings; and point-to-point measurements of seed/barrier thickness.

The measurements after edge bead removal include measuring of the thickness profile of layers at wafer edge; scanning of wafer circumference while oscillating, for mapping edges of metallic coatings; full surface mapping of edge exclusion ring area for detection of residues; full surface mapping of edge exclusion ring area for measurement of residue thickness; and Point-to-point measurements of seed/barrier thickness.

The measurement before annealing include: a single point resistivity measurement based on nominal thickness; a single point resistivity measurement based on thickness extracted from same measurement; measuring of the wafer radial or diameter profile of resistivity based on nominal thickness; measuring of the wafer radial or diameter profile of resistivity based on thickness extracted from the same measurement; the wafer surface mapping of resistivity based on nominal thickness; and the wafer surface mapping of resistivity based on thickness extracted from same measurement.

The after annealing measurements include a single point resistivity measurement based on nominal thickness; a single point resistivity measurement based on thickness extracted from the same measurement; measuring of the wafer to radial or diameter profile of resistivity based on nominal thickness; measuring of the wafer diameter profile of resistivity based on thickness extracted from the same measurement; the wafer surface mapping of resistivity based on nominal thickness; the wafer surface mapping of resistivity based on thickness extracted from the same measurement.

In a certain mode of operation, the system can be utilized for various combinations of measurements prior to CMP process, measurements between CMP process steps and after the CMP process.

The prior to CMP measurements include measuring the following: center point sheet resistance measurement; center point thickness measurement; measuring wafer diameter profile of sheet resistance or thickness; measuring wafer radial or diameter profile of pattern step-height; wafer surface mapping of sheet resistance or thickness; wafer surface mapping of pattern step-height; full die surface mapping for within-die uniformity; and thickness profile of layers at wafer edge.

The between CMP steps measurements include measuring the following: center point thickness measurement; measuring wafer diameter profile of sheet resistance or thickness; measuring wafer radial or diameter profile of pattern step-height; wafer surface mapping of sheet resistance or thickness; wafer surface mapping of pattern step-height; full die surface mapping for within-die uniformity; and thickness profile of layers at wafer edge.

The after CMP measurement includes: full surface or local area mapping for detection of residues; full surface or local area mapping for measurement of residue thickness; and Point-to-point measurements of residue thickness based on detection during previous scanning.

Those skilled in the art will readily appreciate that various modifications and changes can be applied to the embodiments of the invention as hereinbefore exemplified without departing from its scope defined in and by the appended claims.

What is claimed is:

1. A method for measuring in an electrically conductive film of a specific sample, the method comprising:

providing data indicative of a free space response of an RF sensing coil unit to AC voltage applied to the RF sensing coil;

locating said sensing coil proximate to the sample at a distance h substantially not exceeding 0.2 r wherein r is the coil radius; supplying an AC voltage in a range from 100 MHz to a few GHz to the sensing coil to cause generation of an eddy current passage through the conductive film; detecting a response of said sensing coil to an effect of the electric current through the conductive field onto a magnetic field of the coil and generating measured data indicative of said response; and utilizing said data indicative of the free space measurements to analyze the measured data and to determine at least a thickness of the conductive film in said specific sample, the method providing for measuring in conductive films with a sheet resistance $R_s$ in a range from about 0.009 to about 2 Ohm/m$^2$.

2. The method of claim 1, wherein said electrically conductive film is a metal film.

3. The method of claim 1, wherein said metal film is copper containing film.

4. The method according to claim 1, wherein the measurable thickness is in a range about 0.01 to 3 micron.

5. The method of claim 1 wherein said data indicative of the free space response includes information about environment conditions effects on the free space response.

6. The method of claim 1 wherein said data indicative of the free space response includes information about temperature conditions effects on the free space response.

7. The method of claim 1 wherein said data indicative of the free space response includes a real part of the free space impedance as a function of the AC voltage frequency.

8. The method of claim 1 wherein said data indicative of the free space response includes an imaginary part of the free space reflectance signal as a function of the AC voltage frequency.

9. The method of claim 7 comprising providing data indicative of unique values of the AC voltage frequency for various thicknesses of the conductive film, respectively.

10. The method of claim 9, wherein said analyzing of the measured data comprising determining the thickness of the conductive film in the specific sample as that corresponding to a frequency point of intersection between the measured real part of the with-sample response as a function of frequency and the real part of the free-space response as a function of frequency.

11. The method of claim 8 comprising providing data indicative of unique values of the AC voltage frequency for various thicknesses of the conductive film, respectively.

12. The method of claim 11, wherein said analyzing of the measured data comprising determining the thickness of the conductive film in the specific sample as that corresponding to a frequency point of intersection between the measured imaginary part of the with-sample response as a function of frequency and the imaginary part of the free-space response as a function of frequency.

13. The method of claim 1 comprising:

providing a model in the form of simulated eddy current induced impedance $\Delta Z^{sim}$ as function of the following parameters: a distance h between the sample and the coil, a thickness d of the conductive film, a frequency f of the AC voltage, a radius r of the coil, conductivity of the film $\sigma$, and the sample-coil off-set $\Delta h$, namely $\Delta Z^{sim}(d_i, h_j, f, r_k, \sigma, \Delta h)$;

optimizing the model;

determining the thickness in the specific sample by finding a best fit between the measured data and that obtained with the optimized model.

14. The method of claim 13 wherein said optimizing the model includes minimizing a difference between eddy current induced impedance $\Delta Z$ measured for various thicknesses of the conductive film and sample-coil distances and the simulated impedance $\Delta Z^{sim}(d_i, h_j, f, r_k, \sigma, \Delta h)$.

15. The method of claim 14, wherein the optimization includes finding defining values for the radius r of the coil, the conductivity of the film $\sigma$, and the sample-coil off-set $\Delta h$.

16. The method of claim 15, wherein said optimizing utilizes minimizing a merit function:

$$MF_3(r_k, \sigma, \Delta h) = \frac{1}{N_f} \sum_f \sum_j \sum_i |\Delta Z^{meas}(d_i, h_j, f) - \Delta Z^{sim}(d_i, h_j; r_k, f, \sigma, \Delta h)|^2.$$

17. The method of claim 16, wherein said analyzing of the measured data utilizes minimizing of a merit function:

$$MF_4(d, h) = \frac{1}{N_f} \sum_f |\Delta Z^{meas}(f) - \Delta Z^{sim}(d, h, f)|^2.$$

18. The method of claim 15, wherein said optimizing includes defining the frequency value.

19. The method of claim 18, wherein said optimizing utilizes minimizing a merit function:

$$MF(r_k, f, \sigma, \Delta h) = \sum_j \sum_i |\Delta Z^{meas}(d_i, h_j) - \Delta Z^{sim}(d_i, h_j; r_k f, \sigma, \Delta h)|^2.$$

20. The method of claim 18, wherein said analyzing of the measured data utilizes minimizing of a merit function:

$$MF_2(d,h) = |\Delta Z^{meas} - \Delta Z^{sim}(d,h)|^2.$$

21. The method of claim 1, wherein said analyzing of the measured data comprises determining a ratio between the eddy current induced resistance $\Delta R_{Eddy}$ and the eddy current induced inductance $\Delta L_{Eddy}$, $\Delta L_{Eddy}/\Delta R_{Eddy}$, said ratio being proportional to the thickness of the conductive film in said specific sample under measurements:

$$\frac{\Delta L_{Eddy}}{\Delta R_{Eddy}} \approx \alpha \cdot d \cdot K(d, h)$$

wherein $\alpha$ is a constant determined by calibration, and K is weakly dependent on the distance h for small thickness d and is dependent on $\Delta L_{Eddy}$ for higher thickness values.

22. The method of claim 1 for determining the topography of the sample defined by its upper electrically conductive layer.

23. The method of claim 22, wherein said topography is obtained as a one-dimensional or two-dimensional map of the layer thickness variation.

24. The method of claim 23, wherein said topography is obtained as a one-dimensional or two-dimensional map of the layer thickness variation.

25. The method of claim 24, wherein said topography is determined for the entire surface semiconductor wafer.

26. The method of claim 24, wherein said topography is determined for a die region in the semiconductor wafer.

27. The method of claim 1, for preparing a recipe design for controlling processing of the sample.

28. The method of claim 27 comprising measuring the thickness while two-dimensionally scanning the semiconductor wafer at least within selected die regions thereof.

29. The method of claim 1 for feed-back or feed-forward control of processing the sample, wherein said processing includes one of the following: electroplating, annealing, CMP, and PVD.

30. The method of claim 29, wherein the controlling of the electroplating includes measuring in a barrier/seed layer in the sample prior to the electroplating and determining at least one of the following parameters of said layer: sheet resistance; thickness; resistivity; radial or diameter profile of the sheet resistance or thickness; surface mapping of the sheet resistance or thickness; radial or diameter profile of the layer non-uniformity; and surface mapping of the layer non-uniformity.

31. The method of claim 29, wherein the controlling of the electroplating includes measuring in a barrier/seed layer in the sample after the electroplating and determining at least one of the following parameters of said layer: center point sheet resistance; center point thickness; radial or diameter profile of the sheet resistance or thickness; diameter profile of a pattern step-height; surface mapping of the sheet resistance or thickness; surface mapping of a pattern step-height; full die surface mapping for within-die uniformity; thickness profile of layers at wafer edge; mapping edges of metallic coatings; and point-to-point measurements of the layer thickness.

32. The method of claim 29, wherein the controlling of the annealing process includes at least one of the following carried out prior to the annealing process: a single point resistivity measurement based on nominal thickness; a single point resistivity measurement based on thickness extracted from the same measurement; measuring the wafer radial or diameter profile of resistivity based on the nominal thickness; measuring the wafer radial or diameter profile of resistivity based on the thickness extracted from the same measurement; the wafer surface mapping of resistivity based on the nominal thickness; and the wafer surface mapping of resistivity based on the thickness extracted from same measurement.

33. The method of claim 29, wherein the controlling of the annealing process includes at least one of the following carried out prior to the annealing process: a single point resistivity measurement based on a nominal thickness; a single point resistivity measurement based on a thickness extracted from the same measurement; measuring the wafer radial or diameter profile of resistivity based on the nominal thickness; measuring the wafer diameter profile of resistivity based on a thickness extracted from the same measurement; the wafer surface mapping of resistivity based on the nominal thickness; the wafer surface mapping of resistivity based on a thickness extracted from the same measurement.

34. The method of claim 29, wherein the controlling of the CMP process includes the measurements carried out prior to the CMP process, between the CMP process steps, and/or after the CMP process.

35. The method of claim 34, wherein the prior to CMP measurements include measuring at least one of the following: center point sheet resistance measurement; center point thickness measurement; measuring wafer diameter profile of sheet resistance or thickness; measuring wafer radial or diameter profile of pattern step-height; wafer surface mapping of sheet resistance or thickness; wafer surface mapping of pattern step-height; full die surface mapping for within-die uniformity; and thickness profile of layers at wafer edge.

36. The method of claim 34 wherein the measurements performed between the CMP process steps include measuring at least one of the following: center point thickness; wafer diameter profile of sheet resistance or thickness; wafer radial or diameter profile of pattern step-height; wafer surface mapping of sheet resistance or thickness; wafer surface mapping of pattern step-height; full die surface mapping for within-die uniformity; and thickness profile of layers at wafer edge.

37. The method of claim 34 wherein the measurements performed after the CMP process include at least one of the following: full surface or local area mapping thereby enabling detection of residues; fill surface or local area mapping thereby enabling measuring of a residue thickness; and point-to-point measurements of residue thickness.

38. The method of claim 1 for feed-back or feed-forward control of an after edge bead removal process applied to a semiconductor wafer, the measurement including at least one of the following: measuring the thickness profile of layers at wafer edge; scanning the wafer circumference while oscillating, for mapping edges of metallic coatings; full surface mapping of edge exclusion ring area for detection of residues; full surface mapping of edge exclusion ring area for measurement of residue thickness; and point-to-point measurements of seed/barrier thickness.

39. A method for measuring in a copper film of a sample, the method comprising:
  providing data indicative of a free space response of an RF sensing coil unit to AC voltage applied to the RF sensing coil;
  locating said sensing coil proximate to the sample at a distance h substantially not exceeding 0.2 r wherein r is the coil radius; supplying an AC voltage in a range from 200 MHz to 500 MHz to the sensing coil thereby causing generation of an eddy current passage through the conductive film; detecting a response of said sensing coil to an effect of the electric current through the conductive field onto a magnetic field of the coil and generating measured data indicative of said response; and analyzing the measured data and said data indicative of the free space measurements to determine at least one of thickness and resistance parameters of the conductive film, the method providing for measuring in copper films with a thickness d in a range from about 0.01 µm to about 3 µm.

40. The method of claim 39 for determining the topography of the sample defined by its upper electrically conductive layer.

41. A system for measuring in an electrically conductive film of a sample, the system comprising:

an RF sensing coil operable to generate a magnetic field thereby causing an eddy current passage through the conductive film located proximate to the coil;

an AC voltage generator connected to said sensing coil, said AC voltage generator being operable to generate AC voltage of a frequency ranging between 100 MHz and a few GHz;

a detector, which is connected to the sensing coil and operable to detect an effect of the electric current passage through the conductive field onto a magnetic field of the coil and generate a corresponding response signal;

a control unit connectable to the AC voltage generator to operate it and connectable to the detector to receive and analyze the response signal, the control unit operating said AC voltage generator to provide at least two operating frequencies of the AC voltage within said range and thereby determining a value of said response as a function of the frequency, and utilizing calibration data to analyze said function and determine at least one of thickness and conductivity of the conductive film.

* * * * *